(12) United States Patent
Osaka et al.

(10) Patent No.: US 8,554,273 B2
(45) Date of Patent: Oct. 8, 2013

(54) MOBILE ELECTRONIC DEVICE AND MOBILE SYSTEM

(75) Inventors: Masashi Osaka, Yokohama (JP); Jouji Yoshikawa, Yokohama (JP); Yasushi Kitamura, Yokohama (JP); Seiji Horii, Yokohama (JP); Tomoko Asano, Yokohama (JP)

(73) Assignee: Kyocera Corporation, Kyoto (JP)

( * ) Notice: Subject to any disclaimer, the term of this patent is extended or adjusted under 35 U.S.C. 154(b) by 43 days.

(21) Appl. No.: 13/201,725

(22) PCT Filed: Feb. 25, 2010

(86) PCT No.: PCT/JP2010/052928
§ 371 (c)(1),
(2), (4) Date: Aug. 16, 2011

(87) PCT Pub. No.: WO2010/098373
PCT Pub. Date: Sep. 2, 2010

(65) Prior Publication Data
US 2011/0300904 A1    Dec. 8, 2011

(30) Foreign Application Priority Data

Feb. 25, 2009  (JP) ................... 2009-043199
Mar. 26, 2009  (JP) ................... 2009-077782
Sep. 28, 2009  (JP) ................... 2009-223504

(51) Int. Cl.
*H04M 1/00*    (2006.01)

(52) U.S. Cl.
USPC .................... 455/556.1; 455/550.1

(58) Field of Classification Search
USPC .............. 455/556.1, 571–574, 13.4, 418–420
See application file for complete search history.

(56) References Cited

U.S. PATENT DOCUMENTS

| | | | |
|---|---|---|---|
| 2005/0088620 A1* | 4/2005 | Dwyer et al. | 353/15 |
| 2005/0094110 A1* | 5/2005 | Nakamura | 353/85 |
| 2006/0170882 A1* | 8/2006 | Schwartz et al. | 353/85 |
| 2007/0265717 A1* | 11/2007 | Chang | 700/83 |
| 2009/0021652 A1* | 1/2009 | Tarlton et al. | 348/836 |
| 2009/0213332 A1 | 8/2009 | Fujinawa et al. | |
| 2010/0060618 A1 | 3/2010 | Okuda et al. | |

FOREIGN PATENT DOCUMENTS

| | | |
|---|---|---|
| JP | 2000-321531 A | 11/2000 |
| JP | 2003-295310 A | 10/2003 |
| JP | 2004-235965 A | 8/2004 |
| JP | 2007-047577 A | 2/2007 |
| JP | 2007-096542 A | 4/2007 |
| JP | 2007-228551 A | 9/2007 |
| JP | 2009-003428 A | 1/2009 |

OTHER PUBLICATIONS

International Search Report for PCT/JP2010/052928 mailed Apr. 6, 2010.

* cited by examiner

*Primary Examiner* — Chuong A Ngo
(74) *Attorney, Agent, or Firm* — Lowe, Hauptman & Ham

(57) ABSTRACT

An object is to provide a mobile electronic device with high operability and high safety. The mobile electronic device includes an image projector that projects an image, a control unit that controls a projection operation by the image projector, and a cabinet that supports the image projector and the control unit. The control unit can select a first mode and a second mode, and controls an operation of the image projector, when the first mode is selected, in a condition different from that when the second mode is selected. The object is thereby solved.

24 Claims, 14 Drawing Sheets

FIG.5A

|  | OPERATING MODE ||
| --- | --- | --- |
|  | STATIONARY MODE | MOBILE MODE |
| WHEN PLACED ON CHARGING BASE OR WHEN ATTACHED WITH AC ADAPTER | SELECTABLE | NOT SELECTABLE |
| WHEN NOT PLACED ON CHARGING BASE AND WHEN NOT ATTACHED WITH AC ADAPTER | NOT SELECTABLE | SELECTABLE |

FIG.5B

|  | OPERATING MODE ||
| --- | --- | --- |
|  | STATIONARY MODE | MOBILE MODE |
| WHEN PLACED ON CHARGING BASE OR WHEN ATTACHED WITH AC ADAPTER | SELECTABLE | NOT SELECTABLE |
| WHEN NOT PLACED ON CHARGING BASE AND WHEN NOT ATTACHED WITH AC ADAPTER | SELECTABLE | SELECTABLE |

FIG.5C

|  | OPERATING MODE ||
| --- | --- | --- |
|  | STATIONARY MODE | MOBILE MODE |
| WHEN PLACED ON CHARGING BASE OR WHEN ATTACHED WITH AC ADAPTER | SELECTABLE | SELECTABLE |
| WHEN NOT PLACED ON CHARGING BASE AND WHEN NOT ATTACHED WITH AC ADAPTER | NOT SELECTABLE | SELECTABLE |

FIG.5D

|  | OPERATING MODE ||
| --- | --- | --- |
|  | STATIONARY MODE | MOBILE MODE |
| WHEN PLACED ON CHARGING BASE OR WHEN ATTACHED WITH AC ADAPTER | SELECTABLE | SELECTABLE |
| WHEN NOT PLACED ON CHARGING BASE AND WHEN NOT ATTACHED WITH AC ADAPTER | SELECTABLE | SELECTABLE |

| | | WHEN DRIVEN BY BATTERY | WHEN CONNECTED TO EXTERNAL POWER SUPPLY | WHEN PLACED ON CHARGING BASE |
|---|---|---|---|---|
| BASE | MOBILE MODE | ○ | ○ | ○ |
| | STATIONARY MODE | × | ○ | ○ |
| SAFETY | AUTOMATIC CONTROL MODE | × | ○ | ○ |
| | ACTIVE CONTROL MODE | ○ | ○ | ○ |
| FUNCTION | THEATER MODE | × | × | ○ |
| | PROJECTIVE ALARM MODE | × | × | ○ |
| | PHOTO FRAME MODE | × | × | ○ |
| | FAN MODE | × | × | ○ |

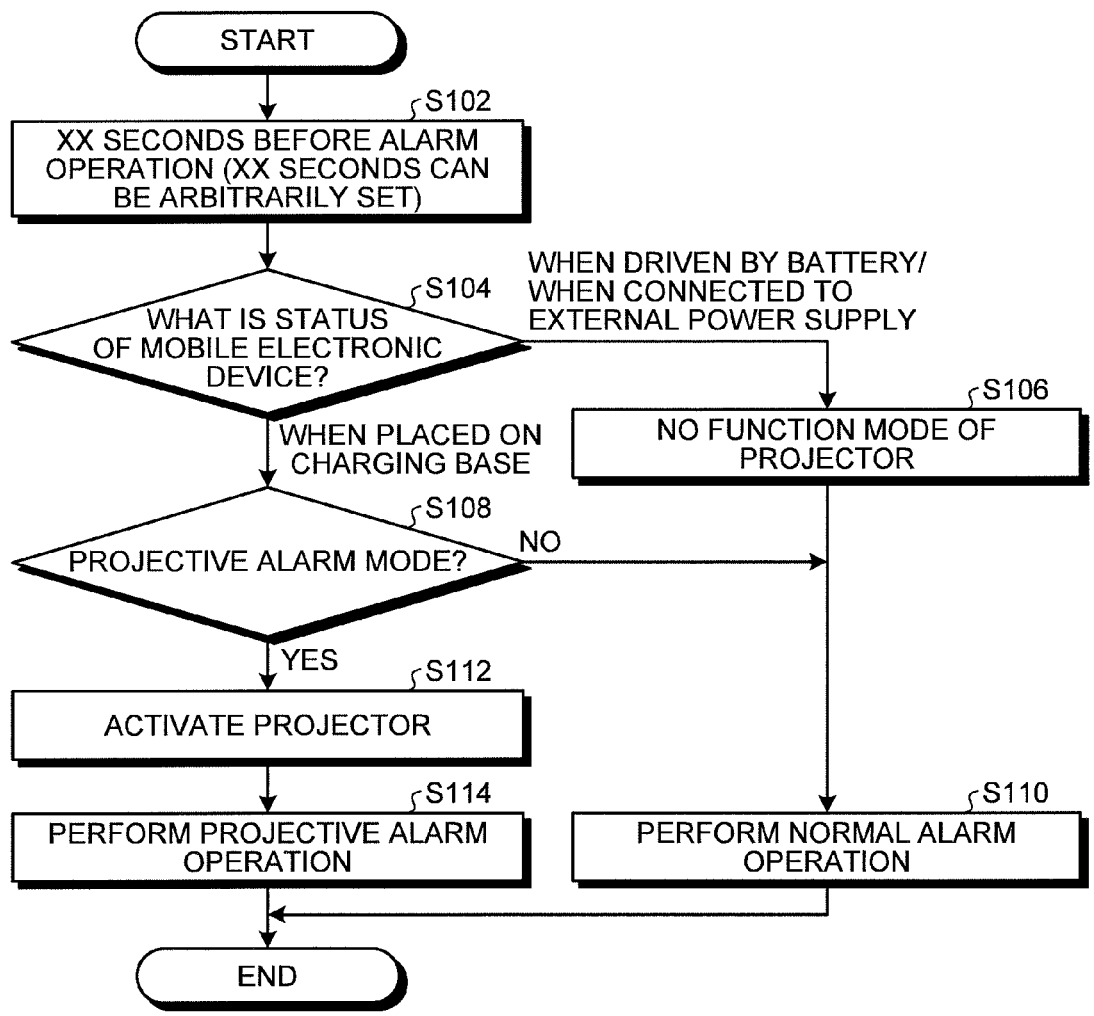

MOBILE ELECTRONIC DEVICE AND MOBILE SYSTEM

RELATED APPLICATIONS

This application is a National Stage of PCT international application Ser. No. PCT/JP2010/052928 filed on February 25, which is based upon and claims the benefit of priority from Japanese Patent Application No. 2009-43199, filed on Feb. 25, 2009, Japanese Patent Application No. 2009-77782, filed on Mar. 26, 2009, and Japanese Patent Application No. 2009-223504, filed on Sep. 28, 2009.

TECHNICAL FIELD

The present invention relates to a mobile electronic device and a mobile system having an image projector for projecting an image to a screen or to a wall surface.

BACKGROUND ART

As a conventional device for projecting an image to a wall surface or a screen, a so-called projector is used. A mainstream of the projector is a so-called stationary type device which is supplied with power from a commercial power supply and is used when it is fixed to a predetermined location. A projector as the stationary type projects, in its fixed state, an image to a given portion of the wall surface or to the screen.

Recently, on the other hand, a mobile projector compact in size and easy to carry is proposed as the projector. For example, Patent Literature 1 describes a mobile terminal with a projector function which incorporates a projector that includes an upper cabinet, a lower cabinet, and a hinge portion for mutually pivotally connecting the upper cabinet and the lower cabinet and that has a lens and a light source.

This type of mobile projector can easily change an area to which an image is projected by the projector. That is, the projector can easily change a light irradiation direction. Therefore, the light may be unintentionally irradiated to a person. Because the projector irradiates high-intensity light, if the light irradiated from the projector directly enters person's eyes at a close position, the person is very dazzled by the irradiated light.

In terms of this point, for example, Patent Literature 2 describes a mobile communication terminal with a projection function that includes a projector for projecting projection data, a detector for detecting a state of the mobile communication terminal, a movement determining unit for determining whether there is any change in the state detected by the detector, and a control unit for sending the projection data to the projector. The mobile communication terminal is capable of controlling a light amount when a person enters a projected light area by transmitting control data for controlling a light amount to be projected by the control unit when the movement determining unit determines that there is a change in the state of the terminal.

CITATION LIST

Patent Literature

Patent Literature 1: Japanese Patent Application Laid-open No. 2007-96542
Patent Literature 2: Japanese Patent Application Laid-open No. 2007-228551

DISCLOSURE OF INVENTION

Problem to be Solved by the Invention

As described in Patent Literature 2, when the state of the terminal changes, the amount of light output from the projector is reduced or the output thereof is stopped, so that a possibility that a direct light may enter person's eyes or that the person may be dazzled by the light can be reduced while an operator is operating the terminal.

Here, the mobile projector is configured so that an operating unit and a projector are basically integrated. Therefore, in order to change a display image, it is necessary to operate the terminal. However, if the projection is stopped or the light amount is reduced each time it is operated, the output is restricted more than necessary, and the image cannot thereby be displayed even if the operator wants it. Moreover, in the case of the mobile projector (mobile electronic device), the operator uses it in his/her hand. However, in the case of the device described in Patent Literature 2, it is difficult to project the image with a normal light amount when the operator holds it in his/her hand.

It is an object of the present invention to provide a mobile electronic device and a mobile system with high operability and high safety.

SUMMARY OF THE INVENTION

According to an aspect of the present invention, a mobile electronic device includes: a cabinet; an image projector that is incorporated in the cabinet and projects an image; and a control unit that controls a projection operation performed by the image projector. The control unit selects either one of a first mode and a second mode, and controls the operation of the image projector, when the first mode is selected, in a condition different from that when the second mode is selected.

According to another aspect of the present invention, the control unit, when the first mode is selected, projects an image while a preset operation is being performed.

According to another aspect of the present invention, the mobile electronic device further includes an input unit that receives a predetermined operation, and the control unit, when the first mode is selected, causes the image projector to project an image according to a preset, predetermined operation received by the input unit.

According to another aspect of the present invention, the control unit selects either one of the first mode and the second mode based on an instruction input by an operator.

According to another aspect of the present invention, the mobile electronic device further includes a status detector that detects whether the cabinet is supported by a base, and the control unit, when it is detected by the status detector that the cabinet is supported by the base, selects the second mode.

According to another aspect of the present invention, the mobile electronic device further includes an acceleration sensor that detects acceleration acting on the cabinet, and the control unit, when the acceleration detected by the acceleration sensor exceeds a given value, selects the first mode.

According to another aspect of the present invention, the control unit, when it is determined that a frequency of acceleration detected by the acceleration sensor is caused by shakiness of hands, selects the first mode.

According to another aspect of the present invention, the mobile electronic device further includes a contact detector that detects whether a predetermined face of the cabinet is in contact with any other member in part of the cabinet, and the control unit, when the second mode is selected and when it is detected by the contact detector that the predetermined face of the cabinet is in contact with the other member, causes the image projector to project an image.

According to another aspect of the present invention, the contact detector is a force detection mechanism that mechanically detects force applied thereto caused by a contact with the other member.

According to another aspect of the present invention, the mobile electronic device further includes a direction detector that detects a direction of the cabinet, and the control unit, when the first mode is selected and when it is detected by the contact detector that the predetermined face of the cabinet is in contact with the other member, causes the image projector to project an image in a direction such that an upper portion of the image corresponds to an upper side in a vertical direction based on the direction of the cabinet detected by the direction detector.

According to another aspect of the present invention, the direction detector is formed with an acceleration sensor that detects an acceleration acting on the cabinet and a calculator that calculates a direction, by the acceleration sensor, on which gravity acts.

According to another aspect of the present invention, a mobile electronic device includes: a power unit that supplies power to an image projector and a control unit, and includes a battery that is charged by external power supply; a cabinet that supports the image projector and the control unit; a support detector that detects whether the cabinet is supported by a dedicated base for supporting the cabinet; and a charging detector that detects whether the power is supplied externally to the power unit. The control unit includes at least one of specific control modes in which an operation of the image projector is controlled in a set condition, and the specific control mode is selected only when it is detected by the support detector that the mobile electronic device is supported by the dedicated base and it is detected by the charging detector that the power is supplied externally.

According to another aspect of the present invention, at least one of the specific control modes is a control mode for controlling an operation of the image projector in a condition such that power consumption is larger than that in the other control modes.

According to another aspect of the present invention, at least one of the specific control modes is a mode for increasing intensity of light projected from the image projector.

According to another aspect of the present invention, at least one of the specific control modes is a mode for continuously projecting images.

According to another aspect of the present invention, the control unit selects either one of a first mode for controlling an operation of the image projector and a second mode for controlling an operation of the image projector in a condition different from that in the first mode, and the second mode is selected only when it is detected by the charging detector that the power is supplied externally.

According to another aspect of the present invention, the control unit, when the first mode is selected, projects an image while a preset operation is being performed.

According to another aspect of the present invention, the mobile electronic device further includes an input unit that receives a predetermined operation, and the control unit, when the first mode is selected, causes the image projector to project an image according to a preset, predetermined operation received by the input unit.

According to another aspect of the present invention, the control unit selects either one of the first mode and the second mode based on an instruction input by an operator.

According to another aspect of the present invention, the mobile electronic device further includes an acceleration sensor that detects acceleration acting on the cabinet, and the control unit, when the acceleration detected by the acceleration sensor exceeds a given value, selects the first mode.

According to another aspect of the present invention, the control unit, when it is determined that a frequency of acceleration detected by the acceleration sensor is caused by shakiness of hands, selects the first mode.

According to another aspect of the present invention, a mobile system comprises: a mobile electronic device, including an image projector that projects an image, a control unit that controls a projection operation performed by the image projector, a power unit that supplies the power to the image projector and the control unit and includes a battery that is charged by external power supply, a cabinet that supports the image projector and the control unit, a support detector that detects whether the cabinet is supported by a dedicated base for supporting the cabinet, and a charging detector that detects whether the power is supplied externally to the power unit; and a dedicated base for supporting a cabinet of the mobile electronic device, including a cooling mechanism for cooling the mobile electronic device. The control unit includes at least one specific control mode in which an operation of the image projector is controlled in a set condition, and the specific control mode is selected only when it is detected by the support detector that the mobile electronic device is supported by the dedicated base and it is detected by the charging detector that the power is supplied externally.

According to another aspect of the present invention, the dedicated base includes a lens unit in an area where light irradiated from the image projector passes, and the lens unit changes an angle of view of the light irradiated from the image projector.

According to another aspect of the present invention, the battery is connected to an external power supply through the dedicated base.

Effect of the Invention

The mobile electronic device according to the present invention can switch between the first mode and the second mode, switch between control conditions according to a use mode by the operator, and perform more appropriate control. In this way, there is such an effect that the operability and the safety can be enhanced.

The mobile electronic device and the mobile system according to the present invention can switch between the control modes depending on whether the mobile electronic device is held in the dedicated base and the power is supplied externally, so that more appropriate control can be performed. In this way, there is such an effect that the operability and the safety can be enhanced.

BRIEF DESCRIPTION OF DRAWINGS

FIG. 5A is an explanatory diagram of one example of controls in the mobile electronic device.

FIG. 5B is an explanatory diagram of one example of controls in the mobile electronic device.

FIG. 5C is an explanatory diagram of one example of controls in the mobile electronic device.

FIG. 5D is an explanatory diagram of one example of controls in the mobile electronic device.

FIG. 16 is a flowchart illustrating one example of the operation of the mobile electronic device.

DESCRIPTION OF EMBODIMENTS

The present invention will be explained in detail below with reference to the drawings. It should be noted that the present invention is not limited by the following explanation. Besides, the components explained in the following include those that can be easily thought of by persons skilled in the art, and substantially equivalents or those in an equivalent scope. A mobile phone as a mobile electronic device will be explained hereinafter as an example, however, an applied target of the present invention is not limited to the mobile phone. The present invention can also be applied to, for example, PHS (Personal Handyphone System), PDA, a portable navigation device, a notebook-size personal computer, and a game machine.

Figure 1:
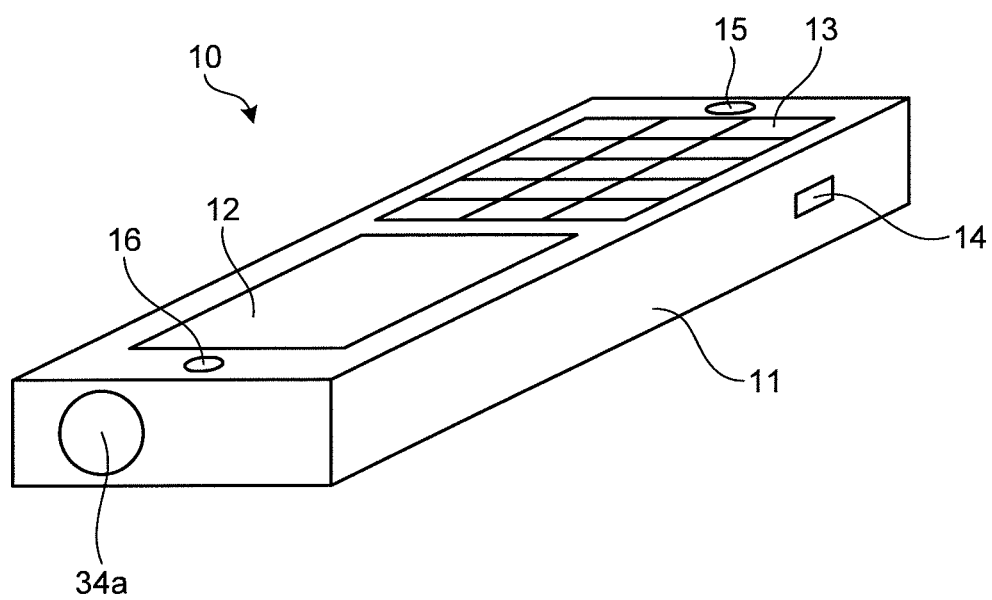
FIG. 1 is a perspective view illustrating a schematic configuration of one embodiment of a mobile electronic device.

First, an external configuration of the mobile electronic device is explained. FIG. 1 is a perspective view illustrating a schematic configuration of one embodiment of the mobile electronic device. A mobile electronic device 10 is a mobile phone provided with a wireless communication function. The mobile electronic device 10 is a straight mobile phone with units stored inside of one box-shaped cabinet 11. In the present invention, the cabinet 11 is formed to a box shape, however, the cabinet may be formed with two members coupled to each other by a hinge and thereby be foldable, or the cabinet may be configured to have two members which are slidable. A cabinet connected with three or more members can also be used.

The cabinet 11 is provided with a display 12 as a display unit illustrated in FIG. 1. The display 12 displays a predetermined image, such as a standby image when the mobile electronic device 10 is in a standby state for waiting for reception and a menu image used to help operation of the mobile electronic device 10.

The cabinet 11 is provided with a plurality of operation keys 13 used to enter a telephone number of an intended party or to enter text when an email is created. In addition, a dedicated key 14 for controlling operations of a projector 34, explained later, is provided in one of sides of the cabinet 11 (one of faces substantially orthogonal to a face where the operation keys 13 are provided). The operation keys 13 and the dedicated key 14 constitute an operating unit of the mobile electronic device 10. The cabinet 11 is also provided with a microphone 15 that receives a voice during talking on the mobile electronic device 10, and with a receiver 16 that emits voice during talking on the mobile electronic device 10.

A light emitting portion 34a of the projector 34 for projecting an image is provided on a top face of the cabinet 11 (one side of the top face meets a face where the operation keys 13 are provided and one side of the other sides meets a face where the dedicated key 14 is provided).

Figure 2:
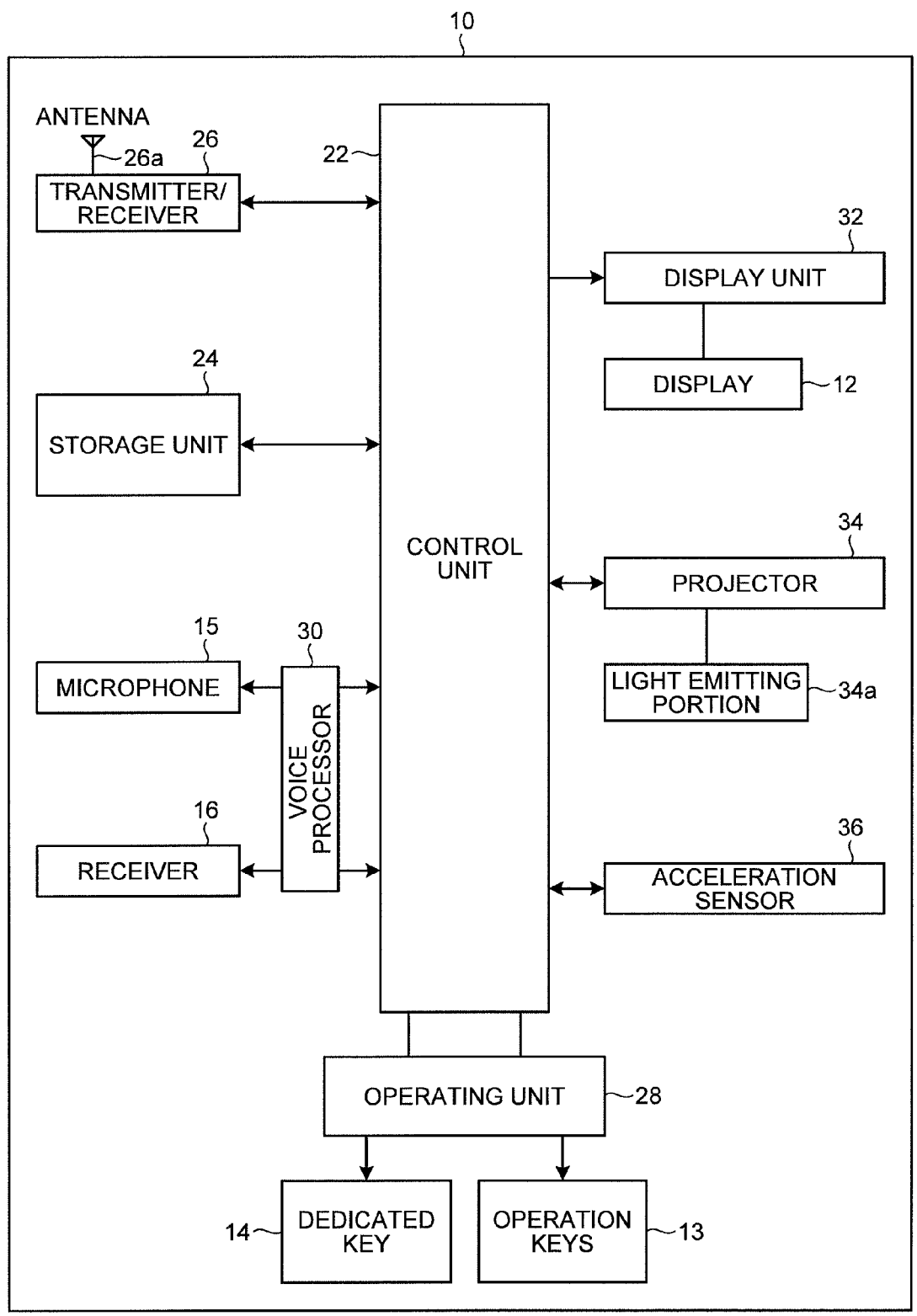
FIG. 2 is a block diagram of the schematic configuration of the mobile electronic device as illustrated in FIG. 1.

FIG. 2 is a block diagram illustrating the schematic configuration of functions of the mobile electronic device as illustrated in FIG. 1. The mobile electronic device 10 as illustrated in FIG. 2 includes a control unit 22, a storage unit 24, a transmitter/receiver 26, an operating unit 28, a voice processor 30, a display unit 32, a projector 34, and an acceleration sensor 36.

The control unit 22 is a processor such as a CPU (central processing unit) that integrally controls an overall operation of the mobile electronic device 10. That is, the control unit 22 controls the operations of the transmitter/receiver 26, the voice processor 30, and the display unit 32 or the like so that the various processes of the mobile electronic device 10 are executed in an appropriate sequence according to the operation of the operating unit 28 and software stored in the storage unit 24 of the mobile electronic device 10. The various processes of the mobile electronic device 10 include, for example, voice communication performed through a line switching network, creation and transmission/reception of an electronic mail, and browsing to a Web (World Wide Web) site on the Internet. In addition, the operations of the transmitter/receiver 26, the voice processor 30, and the display unit 32 or the like include signal transmission/reception by the transmitter/receiver 26, voice input/output by the voice processor 30, and display of an image by the display unit 32.

The control unit 22 executes processes based on programs (e.g., operating system program and application programs) stored in the storage unit 24. The control unit 22 is formed with, for example, a MPU (Micro Processing Unit), and executes the various processes of the mobile electronic device 10 according to the sequence instructed by the software. That is, the control unit 22 sequentially loads operation codes from the operating system program and the application programs stored in the storage unit 24, and executes the processes.

The control unit 22 has a function of executing a plurality of application programs. The application program executed by the control unit 22 includes a plurality of application programs such as an application program for controlling the drive of the projector and game application programs for activating various games.

The storage unit 24 stores therein software and data used for processes performed by the control unit 22, a task for activating an application program that controls the drive of the projector and a task for activating various game application programs.

The storage unit 24 stores therein, in addition to these tasks, for example, voice data through communication and downloaded voice data, or software used by the control unit 22 for controlling the storage unit 24, and telephone numbers and email addresses of communication opposite parties, and also stores therein addresses to be managed, a sound file of a dial tone and a ring tone or the like, temporary data used for a process of software. The computer programs and the temporary data used for the processes of the software are temporarily stored in a work area allocated to the storage unit 24 by the control unit 22. The storage unit 24 is formed with, for example, a nonvolatile storage device (e.g., nonvolatile semiconductor memory such as ROM: Read Only Memory, and a hard disk drive), and a readable/writable storage device (e.g., SRAM: Static Random Access Memory, and DRAM: Dynamic Random Access Memory).

The transmitter/receiver 26 includes an antenna 26a, and establishes a wireless signal line based on CDMA system with a base station through a channel allocated by the base station, and performs telephone communication and information communication with a base station.

The operating unit 28 is formed with the operation keys 13 such as Power key, Talk key, Numeric keys, Character keys, Direction key, OK key, and Send key to which various functions are allocated respectively, and with the dedicated key 14. When these keys are used to enter information through the operation by the user, the operating unit 28 emits a signal corresponding to the content of the operation. The emitted signal is input to the control unit 22 as an instruction of the user.

The voice processor 30 executes processes of a voice signal input to the microphone 15 and a voice signal output from the receiver 16. That is, the voice processor 30 amplifies the voice input through the microphone 15, subjects the voice to AD conversion (Analog to Digital conversion), then further subjects the voice to signal processing such as coding, converts the coded voice to digital voice data, and outputs the digital voice data to the control unit 22. Moreover, the voice processor 30 decodes the digital voice data sent from the control unit 22, subjects the decoded data to DA conversion (Digital to Analog conversion), subjects the converted data to processes such as amplification to be converted to an analog voice signal, and outputs the analog voice signal to the receiver 16.

The display unit 32 is provided with a display panel (such as the display 12) formed with a LCD (Liquid Crystal Display) or an organic EL (Electro-Luminescence) panel or the like, and displays a video image according to video data supplied from the control unit 22 and an image according to image data on the display panel. The display unit 32 may be provided with, for example, a sub-display at a location that is exposed to the outside even when the cabinet is closed, in addition to the display 12.

Figure 3:
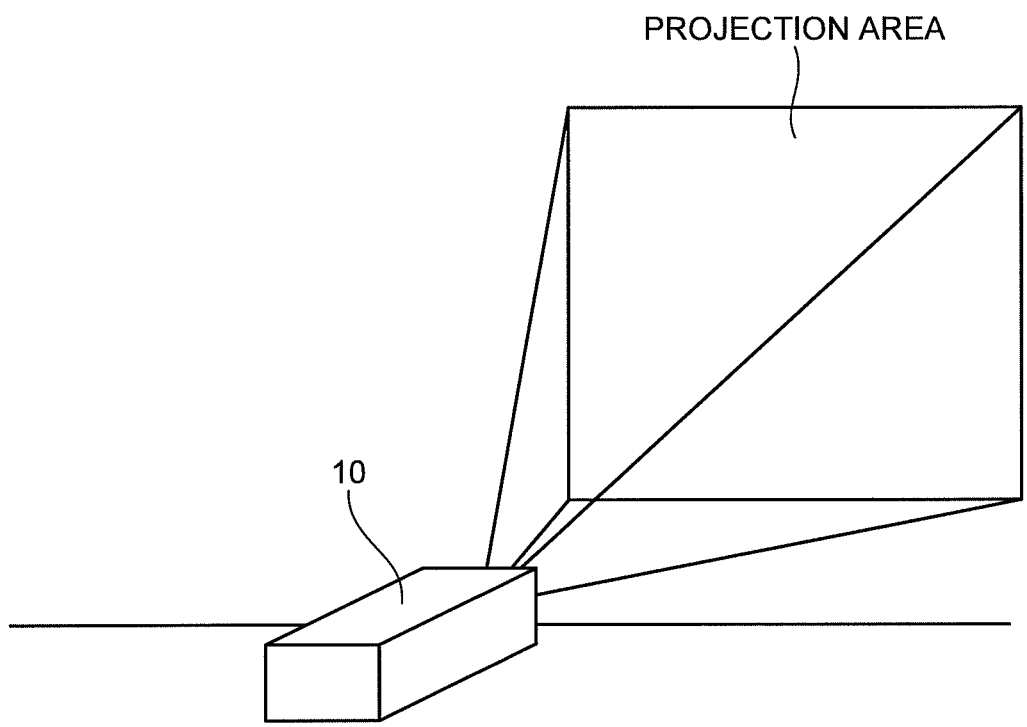
FIG. 3 is an explanatory diagram illustrating a state in which an image is displayed by the mobile electronic device as illustrated in FIG. 1.

The projector 34 is an image projection mechanism for projecting an image, and, as explained above, is provided with the light emitting portion 34a for projecting an image, on the top face of the cabinet 11. FIG. 3 is an explanatory diagram illustrating a state in which an image is displayed by the mobile electronic device as illustrated in FIG. 1. The mobile electronic device 10 projects an image from the light emitting portion 34a of the projector 34. In other words, by emitting the light forming the image, as illustrated in FIG. 3, an image can be projected to a given area (projection area) of a wall surface or a screen on a plane opposite to the top face of the cabinet 11. The operation of projector 34 is controlled by the control unit 22, so that various video images such as films and presentation materials sent from the control unit 22 are projected and displayed on the projection area.

The projector 34 is formed with a light source and an optical system that switches whether the light emitted from the light source is projected, according to the image data. For example, a projector configured with a halogen light, a LED light source, or an LD light source as the light source and with an LCD (Liquid Crystal Display) or a DMD (Digital Micromirror Device) as the optical system can be used as the projector 34. In this case, the optical system is provided over the whole area of the projection area corresponding to pixels, and the optical system is turned on or off by synchronizing the light emitted from the light source with the image, so that the image can be projected over the whole area of the projection area. A projector configured with a light source that emits laser light, and with an optical system that includes a switching element for switching whether the light emitted from the light source is to be transmitted and a mirror for subjecting the light having passed through the switching element to raster scanning can be used as the projector 34. In this case, by changing an angle of the light emitted from the laser light by the mirror and scanning the light irradiated from the light source over the whole area of the projection area, the image can be projected to the projection area.

The acceleration sensor 36 is a detector that detects an acceleration applied to the cabinet 11. As the acceleration sensor 36, a detector that detects an acceleration using various methods can be used. For example, a detector that detects an acceleration based on a change in capacitance, a change in piezo resistance, or a change in relative positions can be used. The acceleration sensor 36 detects an acceleration acting on the cabinet 11 when the operator shakes or moves the cabinet 11. The mobile electronic device 10 is basically configured in the above manner.

Figure 4:
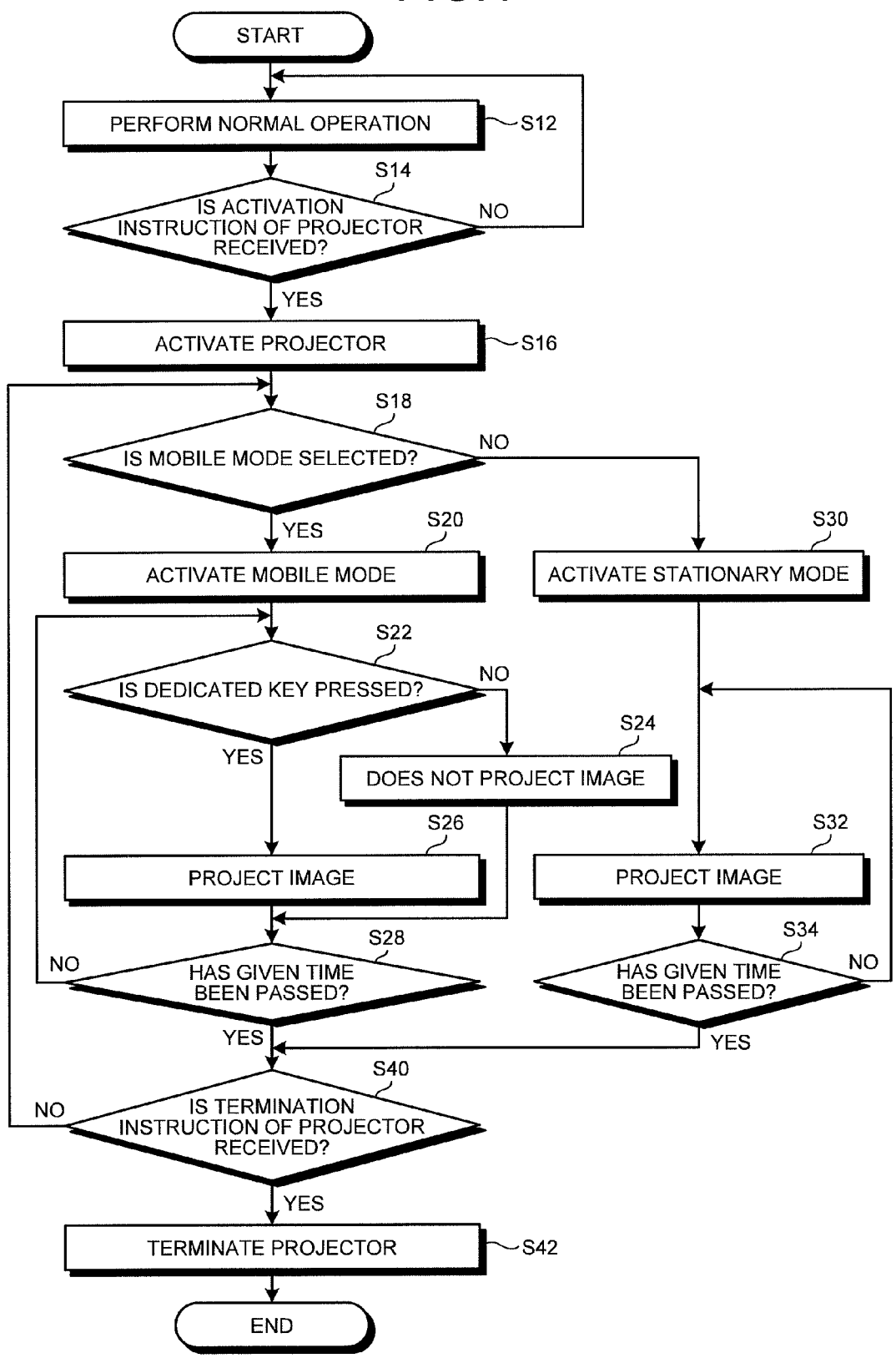
FIG. 4 is a flowchart illustrating one example of the operation of the mobile electronic device.

Next, the operation of the mobile electronic device 10, specifically, the control operation of the projector will be explained with reference to FIG. 4. FIG. 4 is a flowchart illustrating one example of the operation of the mobile electronic device. First, the mobile electronic device 10 performs a normal operation as Step S12. The normal operation mentioned here indicates a state where any function other than the projector 34, such as display of a standby image and telephone-call operation, is used. Then, the control unit 22 of the mobile electronic device 10 determines whether an instruction to activate the projector 34 or an activation instruction is received as Step S14. When it is determined that the activation instruction of the projector 34 is not received (No), the control unit 22 proceeds to Step S12 and continues the normal operation. In this manner, the control unit 22 repeats Step S12 and Step S14 until it is detected that the activation instruction of the projector 34 is received.

Next, when it is determined that the activation instruction of the projector is received at Step S14 or it is determined that the activation instruction is received (Yes), the control unit 22 activates the projector 34 as Step S16. The control unit 22 reads a task to control the operation of the projector 34 from the storage unit 24, to activate the application program. The control unit 22 activates the projector 34 at Step S16, and determines whether a mobile mode is selected as Step S18. Here, the control unit 22 has two modes, as a mode to drive the projector 34, a mobile mode (first mode) assuming that the projector 34 is used in a state where the operator is holding the mobile electronic device 10 (cabinet 11), and a stationary mode (second mode) assuming that the projector 34 is used in a state where the operator places the mobile electronic device 10 (cabinet 11) on a desk, a table, or a charging base. Control methods of the mobile mode and the stationary mode will be explained below together with their operations. The mobile mode or the stationary mode according to the present embodiment is selected by the operator. As a timing in which the operator selects the mode, it may be selected at a step at which the control unit 22 proceeds to Step S18, or it may be selected as a previous setting when the normal operation is performed before activation of the projector.

At Step S18, when it is determined that the mobile mode is selected (Yes), then the control unit 22 activates the mobile mode as Step S20. The control unit 22 activates the mobile mode at Step S20, and determines whether the dedicated key 14 is pressed as Step S22. When it is determined that the dedicated key 14 is not pressed at Step S22 (No), the control unit 22 causes the projector 34 not to project the image as Step S24. In other words, the control unit 22 causes the projector 34 not to emit the light. When it is determined that the dedicated key 14 is pressed at Step S22 (Yes), then the control unit 22 causes the projector 34 to project the image as Step S26. In other words, the control unit 22 causes the projector 34 to emit the light.

The control unit 22 controls whether the image is to be projected at Step S22 or Step S24, and determines whether a given time has passed, as Step S28. When it is determined that the given time has not passed at Step S28 (No), then the control unit 22 proceeds to Step S22, while when it is determined that the given time has passed (Yes), then the control unit 22 proceeds to Step S40. In this manner, the control unit 22 repeats the operations from Step S22 to Step S28 until the given time has passed, and switches whether the image is to be projected depending on whether the dedicated key 14 is pressed or not pressed. In the present embodiment, whether the image is to be projected is switched based on the pressing of the key, however, switching may be performed whether the image is to be projected with a light intensity of a predetermined value or less. In this case, the image has to be projected with a light intensity of a predetermined value or less while the dedicated key 14 is not pressed, and the image has to be projected with normal light intensity while the dedicated key 14 is pressed.

When it is determined that the mobile mode is not selected at Step S18 (No), then the control unit 22 activates the stationary mode as Step S30. The control unit 22 activates the stationary mode at Step S30, and causes the projector 34 to project an image, as Step S32. In other words, the control unit 22 causes the projector 34 to emit light. The control unit 22 causes the projector 34 to project the image at Step S32, and determines whether a given time has passed, as Step S34. When it is determined that the given time has not passed at Step S34 (No), then the control unit 22 proceeds to Step S32, and when it is determined that the given time has passed (Yes), the control unit 22 proceeds to Step S40. In this manner, the control unit 22 repeats the operations at Step S32 and Step S34 until the given time has passed, and continues to project the image from the projector 34.

When the given time has passed at Step S28 or at Step S34, then the control unit 22 determines whether an instruction to terminate the drive of the projector 34 or a termination instruction is received, as Step S40. When it is determined that the termination instruction of the projector is not received at Step S40 (No), then the control unit 22 proceeds to Step S18, detects a selected mode, and controls the operation of the projector 34 based on the selected mode. In other words, the control unit 22 repeats the operations until the drive of the projector 34 is stopped. At Step S40, when it is determined that the termination instruction of the projector is received (Yes), the control unit 22 terminates the drive of the projector 34 as Step S42, returns to the normal operation, and ends a process. When the operation is returned to the normal operation, the control unit 22 determines again whether an activation instruction of the projector is received. That is, the control unit 22 repeats the operations in the flowchart illustrated in FIG. 4.

As explained above, the mobile electronic device 10 allows the two modes, the mobile mode and the stationary mode, to be selected. When the mobile mode is selected, the mobile electronic device 10 causes the projector 34 to project an image only when the dedicated key 14 is pressed, while when the stationary mode is selected, the mobile electronic device 10 causes the projector 34 to project an image regardless of whether the dedicated key 14 is pressed.

Thus, when a projection position of the image or an irradiation position of light easily changes in such a case that the operator uses the mobile electronic device in hand, the mobile mode is selected and the image is projected only when the dedicated key 14 is pressed, which allows an instant stop of the image projection when a person cuts in the projection area of the image, that is, allows the light irradiation to be stopped. Especially, if the emitted light is irradiated to the face of the person, the operator can stop the irradiation of the light only by releasing the dedicated key 14, which allows less possibility that the person is dazzled by the irradiated light. Even if the operator suddenly drops the mobile electronic device, the irradiation of the light is stopped. Therefore, when it is not known to which direction the light is irradiated when it drops, the possibility of light irradiation can be reduced, which allows less possibility that the person is dazzled by the irradiated light. Moreover, in order to more reduce the possibility that the person is dazzled by the irradiated light, the emission of the light is preferably stopped when the dedicated key 14 is not pressed as is in the present embodiment. However, as explained above, when the dedicated key 14 is not pressed, by projecting the image with a light intensity of a predetermined value or less or by setting the amount of light to be emitted to a given value or less, the possibility that the person is dazzled by the emitted light can be reduced.

Similarly to the conventional projector, when the projection position of the image is not basically changed in such a case that the mobile electronic device 10 is used while being placed on a desk, a chair, or a table, the stationary mode is selected to always project the image, and this enables the image to be projected in a state where the mobile electronic device 10 is placed. Thus, the operator can continue to project the image without any particular operation. If the mobile electronic device 10 is placed in a predetermined location, basically, the irradiation position of the light is not abruptly changed, and therefore the possibility that the light irradiated from the projector 34 illuminates the face of the person is low. Therefore, even if the image is continuously projected, it is possible to reduce the possibility that the person is dazzled by the irradiated light.

Thus, the operation control is set to be switchable according to the use condition, and this also allows enhanced operability while more reducing the possibility of irradiating the light to the person.

Here, the dedicated key 14 is provided on the side face of the cabinet 11 in the present embodiment, however, the position of the dedicated key 14 is not particularly limited, so that the dedicated key 14 may be provided on the face where the operation keys 13 are provided or may be provided on the bottom face of the cabinet 11. In the embodiment, when the mobile mode is selected, it is configured to project the image only when the dedicated key 14 is pressed, however, the present invention is not limited thereto. Therefore, any key may be used as a key to determine whether the image is to be projected. For example, when a particular key among the operation keys 13 is pressed, the image may be projected, or if any one of the operation keys 13 is pressed, the image may be projected irrespective of any type of keys. In addition, when a touch panel is used instead of the keys, the image may be projected while the operator touches the touch panel.

In the embodiment, it is configured that the operator selects whether the mobile mode is set or the stationary mode is set, however, the present invention is not limited thereto. Therefore, it may be configured that the mobile electronic device 10 detects its conditions and automatically select one of the modes.

For example, the acceleration sensor 36 detects an acceleration acting on the cabinet 11, so that the mode may be selected (switched) based on the detected acceleration. As one example, when the acceleration is not detected or when it can be determined as substantially zero, the control unit 22 sets the stationary mode, and if any case other than this case, the control unit 22 may set the mobile mode. When an acceleration of a given value or more is detected, the control unit 22 may set the mobile mode. In this manner, by switching one mode to the other based on the acceleration, an appropriate control mode can be set without any operation performed by the operator, which enables the operability to be further enhanced while maintaining safety. By setting so as to automatically switch between the modes, it is possible to prevent that the stationary mode is selected despite that the operator is holding the mobile electronic device 10.

Moreover, the control unit 22 detects a frequency of force and a magnitude of the force (amplitude) from the acceleration acting on the cabinet 11, and has only to select the mobile mode if the detected values are numerical values which can be determined as shakiness of hands. In this way, whether the operator is holding the mobile electronic device is determined based on the shakiness of hands, and this allows discrimination between shaking caused by the operator holding it and any other shaking (e.g., shaking caused by an object hitting a desk), thus further enhancing the operability.

Selection is not limited to the selection between the mobile mode and the stationary mode based on the acceleration detected by the acceleration sensor 36. Therefore, it may be detected whether the mobile electronic device 10 is connected to an external power supply (e.g., AD adaptor) used for charging, and a mode may be selected based on the detected result. As a detector that detects whether the power supply and the mobile electronic device 10 are connected to each other, a detection sensor that detects whether a connection terminal of the mobile electronic device 10 is connected with the power supply and a detection sensor that detects power, voltage and/or current supplied externally to the mobile electronic device 10 can be used.

In the case where the mode is switched to the other based on whether the mobile electronic device 10 is connected to the power supply as above, it can be set so that when it is detected that the mobile electronic device 10 is connected to the power supply, the stationary mode is selected, while when it is not detected that the mobile electronic device 10 is connected to the power supply or when it is detected that the mobile electronic device 10 is not connected to the power supply, then the mobile mode is selected. Consequently, when the mobile electronic device 10 is connected to the power supply (power supply cord) and its movement is restricted, the mode is switched to the stationary mode, while when the movement is not restricted, then the mode is switched to the mobile mode, thus enhancing the safety and the operability.

When the power is to be detected, it is preferably identified whether the power is supplied from a commercial power supply such as a provided outlet or is supplied from a dry-cell battery or from a battery of PC and the like connected thereto through USB, based on supplied power, voltage and/or current. In the case where the power can be identified in this manner, it is preferable to select the stationary mode in the case where the power is supplied from the commercial power supply. This can change the mode to be selected depending on whether it is connected to a freely movable power supply such as a dry-cell battery or it is connected to a commercial power supply in which a movement range is restricted by the cord, thus further enhancing the safety and the operability.

When the mobile electronic device 10 is to be charged, it is detected whether the mobile electronic device 10 is placed on a charging base, and the mode may be selected based on the result of detection. Here, as a detector that detects whether the mobile electronic device 10 is placed on the charging base, a contact detection sensor is simply provided at a contact position of the cabinet 11 with the charging base.

In the case where the mode is selected to the other based on whether the mobile electronic device 10 is placed on the charging base as above, it is possible to set so as to select the stationary mode when it is detected that the mobile electronic device 10 is placed on the charging base and to select the mobile mode when it is not detected that the mobile electronic device 10 is placed on the charging base or when it is detected that the mobile electronic device 10 is not placed thereon. This allows the selection of the stationary mode when it is placed on the charging base and the movement is restricted and the selection of the mobile mode when the movement is not restricted.

Moreover, the present invention is not limited to the case where the mode is determined according to the status of the mobile electronic device 10 or according to whether the mobile electronic device 10 is connected to the power supply, or according to whether it is placed on the charging base.

FIGS. 5A to 5D are explanatory diagrams of one example of controls in the mobile electronic device, or explanatory diagrams illustrating operation patterns. First, the operation pattern as illustrated in FIG. 5A is an operation pattern in which when the mobile electronic device 10 is placed on the charging base and/or is connected to the power supply, the stationary mode can be selected but the mobile mode cannot be selected, while when the mobile electronic device 10 is not placed on the charging base and is not connected to the power supply, the stationary mode cannot be selected but the mobile mode can be selected. In other words, the operation pattern as illustrated in FIG. 5A is the one in which one mode is selected according to the status of the mobile electronic device 10.

The operation pattern illustrated in FIG. 5B is the one in which when the mobile electronic device 10 is placed on the charging base and/or is connected to the power supply, the stationary mode can be selected but the mobile mode cannot be selected, while when the mobile electronic device 10 is not placed on the charging base and is not connected to the power supply, both the stationary mode and the mobile mode can be selected. In the case of this operation pattern, when the mobile electronic device 10 is not placed on the charging base and is not connected to the power supply, the operator can select whether to set the stationary mode or to the mobile mode.

The operation pattern illustrated in FIG. 5C is the one in which when the mobile electronic device 10 is placed on the charging base and/or is connected to the power supply, both the stationary mode and the mobile mode can be selected, while when the mobile electronic device 10 is not placed on the charging base and is not connected to the power supply, the stationary mode cannot be selected but the mobile mode can be selected. In the case of this operation pattern, when the mobile electronic device 10 is placed on the charging base and/or is connected to the power supply, the operator can select whether to set the stationary mode or to set the mobile mode.

The operation pattern illustrated in FIG. 5D is the one in which in both the cases where the mobile electronic device 10 is placed on the charging base and/or is connected to the power supply and where the mobile electronic device 10 is not placed on the charging base and is not connected to the power supply, both the stationary mode and the mobile mode can be selected. In the case of this operation pattern, the operator can select whether to set the stationary mode or to set the mobile mode in both of the cases.

In this way, as any one of the four operation patterns as illustrated in FIG. 5A to FIG. 5D, two modes can be selected, thus enhancing the safety and the operability. Moreover, the operator may set one operation pattern of the four operation patterns, or may store only one operation pattern of the four operation patterns as an application program in the mobile electronic device 10.

In the embodiment, the acceleration sensor 36 is provided in the mobile electronic device 10. However, when the detection result of the acceleration is not used at the time of selecting the mobile mode or the stationary mode, the acceleration sensor 36 is not necessarily provided. For example, when the mode is selected only through the selection operation by the operator, there is no need to provide the acceleration sensor.

In the embodiment, the image is continuously projected in the case of the stationary mode, however, it is not limited thereto. Therefore, if the projector 34 detects a person in a light irradiation direction, the projection of the image may be stopped. In this way, the projection of the image is stopped when the person is in the light irradiation direction, and this allows less possibility that the person is dazzled by the irradiated light, thus further enhancing the safety. Here, how the projector 34 detects whether a person is in the light irradiation direction is not particularly limited. For example, it may be configured so that a proximity sensor is provided and when an object is detected within a given distance from the mobile electronic device 10 (cabinet 11) in the light irradiation direction, then it is determined that there is a person therein. The object may be detected by an optical sensor, an infrared sensor, or the like.

Figure 6A:
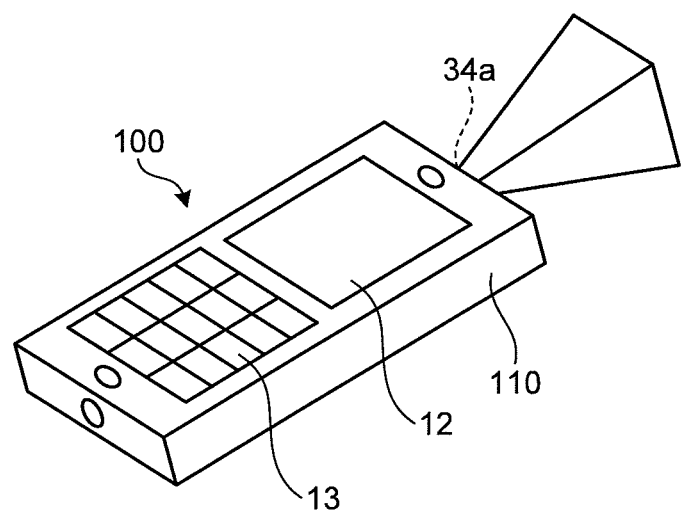
FIG. 6A is a perspective view illustrating a schematic configuration of another embodiment of the mobile electronic device.
Figure 6B:
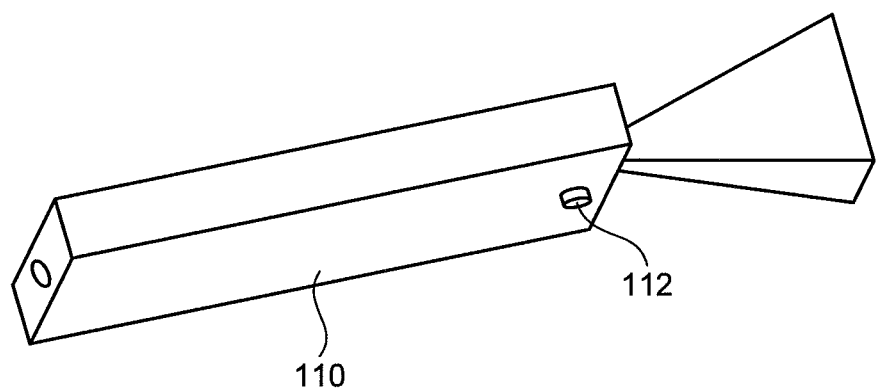
FIG. 6B is a perspective view illustrating the schematic configuration of the mobile electronic device as illustrated in FIG. 6A from a different angle.

It may be configured so that a switch is provided in the cabinet and a light is projected from the projector only when the switch is pressed even in the stationary mode. This case is explained below together with its specific example. FIG. 6A is a perspective view illustrating a schematic configuration of another embodiment of the mobile electronic device, and FIG. 6B is a perspective view illustrating the schematic configuration of the mobile electronic device as illustrated in FIG. 6A from a different angle. A mobile electronic device 100 as illustrated in FIG. 6A and FIG. 6B is provided with a switch member 112 on a face on an opposite side (hereinafter, "rear") to a face of a cabinet 110 where the display 12 and the operation keys 13 are provided. The rest of the configuration of the mobile electronic device 100 is the same as the configuration of the mobile electronic device 10 illustrated in FIG. 1 and FIG. 2.

The switch member 112 is provided on the rear of the cabinet 110 and is protruded therefrom, and detects whether it is in contact with any other member. Any other member mentioned herein includes various members, for example, a floor, a desk, and a table, where the mobile electronic device 100 is placed. The switch member 112 is caused to come in contact with any other member and is thereby applied with an external force, so that the switch member 112 is moved to the inner side of the cabinet 110 to become an ON state. The switch member 112 is provided with a biasing member such as a spring, and is returned to a normal position or to the state where it is protruded by a given distance from the rear when it is not in contact with the other member, to become an OFF state. The switch member 112 sends a signal indicating the ON/OFF state to the control unit 22 (see FIG. 2).

When it is determined that the stationary mode is selected, the control unit 22 of the mobile electronic device 100 detects the ON/OFF signal of the switch member 112. When it is detected that the ON signal is sent from the switch member 112, then the control unit 22 causes the projector 34 to project the image, while when it is detected that the OFF signal is sent from the switch member 112, then the control unit 22 causes the projector 34 not to project the image, that is, to stop projecting the image while the OFF signal is being sent therefrom.

In this way, when the stationary mode is selected, the mobile electronic device 100 projects the image only when the switch member 112 is in contact with the other member, so that the light can be projected from the projector 34 only when the mobile electronic device 100 (cabinet 110 thereof) is placed on the other member. Thus, by detecting that the mobile electronic device 100 is separated from the object where the mobile electronic device 100 is placed, the emission of the light can be stopped when it is picked up or drops from the desk in the case of the stationary mode. This allows less possibility that the person is dazzled by the emitted light whose direction is suddenly changed. When the stationary mode is selected, an image can be projected only when the mobile electronic device 100 is placed on the other member in a predetermined direction, and the image can thereby be projected in an appropriate orientation. In other words, even if any face other than the rear of the cabinet 110 is placed in contact with the other member, the image is not projected, thus preventing the image from being laterally projected.

The mobile electronic device 100 is configured to send both the ON and OFF signals from the switch member, however, it may be configured to send only one of the ON and OFF signals. For example, it may be configured so that the signal is sent only in the ON state and the control unit 22 causes the projector 34 to project the image only when it is detected that the signal is sent from the switch member in the stationary mode.

In the embodiment, the switch member is moved by the action of the external force, and a switch is used to mechanically detect ON/OFF switching in response to detection of the movement. However, any contact detector that detects a contact with the other member may be used, and thus a switch that electrically detects a contact with the other member can also be used. For example, a contact terminal is provided on the rear of the cabinet 110, and this terminal may be used as a switch such that when the contact terminal comes in contact with the other member, a current or the like passes therethrough, and a signal is sent.

The switch member may be used as a dedicated key for pressing in order to project the light when it is determined as the mobile mode. When the switch member is used as the dedicated key to project the image in the mobile mode, the acceleration sensor detects upper and lower directions in the vertical direction, determines a direction of the cabinet 110 of the mobile electronic device 100 or determines whether the rear of the cabinet 110 is directed upward or downward in the vertical direction, and thus it is preferable to control the orientation of an image to be projected so that the upper side of the image corresponds to the upper side in the vertical direction. In this way, by setting the orientation of the image to be projected based on information for the vertical direction detected by the acceleration sensor, the image can be projected in an appropriate direction even if the operator holds the cabinet of the mobile electronic device in its arbitrary direction so as to be easily operated. For example, even if the rear of the cabinet is held upward in the vertical direction so as to easily press the switch member, the image reversely directed to that in the stationary mode is projected by the control of the control unit, and this allows the image to be projected to an irradiation plane in the appropriate orientation. Thus, the image can be made easy to view and the operability can be enhanced.

The acceleration sensor is used as a sensor for detecting the direction of the cabinet in the above explanation, however, the sensor for detecting the direction of the cabinet is not limited thereto. For example, a geomagnetic sensor can also be used. As a sensor, any sensor used for other functions is preferably used because the number of components can be reduced. Therefore, when the acceleration sensor is used to determine whether the mode is the stationary mode or the mobile mode, it is preferable to use the acceleration sensor as a sensor for detecting the direction of the cabinet.

Figure 7A:
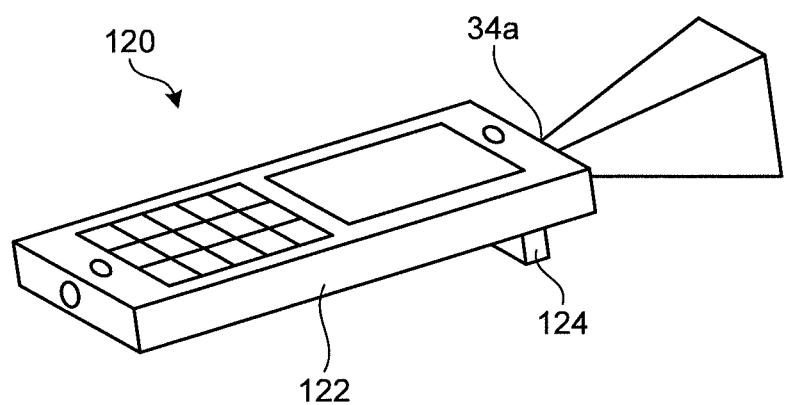
FIG. 7A is a perspective view illustrating a schematic configuration of another embodiment of the mobile electronic device.
Figure 7B:
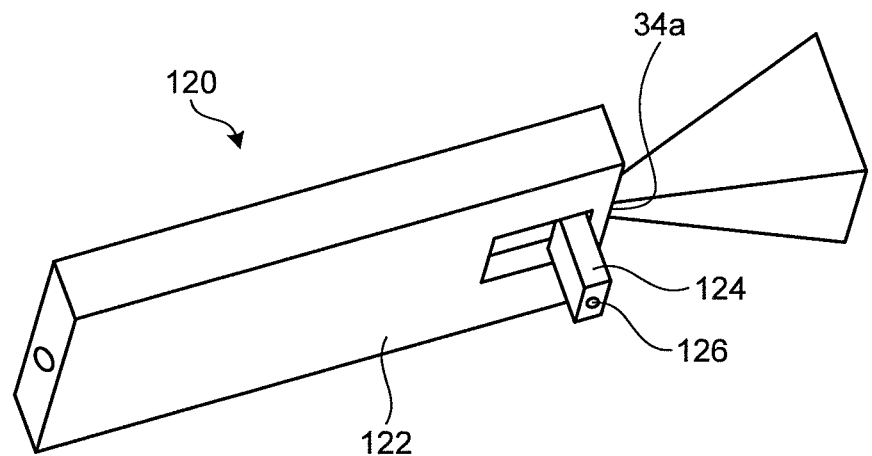
FIG. 7B is a perspective view illustrating the schematic configuration of the mobile electronic device as illustrated in FIG. 7A from a different angle.

The mobile electronic device 100 is provided with the switch member on a part of the rear, however, the provision position of the switch member is not limited thereto. FIG. 7A is a perspective view illustrating a schematic configuration of another embodiment of the mobile electronic device, and FIG. 7B is a perspective view illustrating the schematic configuration of the mobile electronic device as illustrated in FIG. 7A from a different angle. A mobile electronic device 120 illustrated in FIG. 7A and FIG. 7B is provided with a stand 124 on the rear of a cabinet 122 and with a switch member 126 on a face of the stand 124 that contacts with any other member. The rest of the configuration of the mobile electronic device 120 is also the same as the configuration of the mobile electronic device 10 illustrated in FIG. 1 and FIG. 2 except for the stand 124 and the switch member 126.

The stand 124 is a bar member retractable in a concave portion provided in an area on the projector 34 side of the rear of the cabinet 122, and one end thereof is pivotally supported by the cabinet 122. A center axis of the bar member of the stand 124 pivots from an angle parallel to the rear to an angle orthogonal to the rear, or within 90 degrees.

The stand 124 is retracted in the concave portion of the cabinet 122 when the center axis of the bar member is parallel to the rear, so that the one face of the stand 124 is in the same plane as the rear. When the rear side of the cabinet 122 is brought into contact with the other member in a state where the stand 124 is retracted in the concave portion of the cabinet 122, the whole surface of the rear of the cabinet 122 and the one face of the stand 124 come in contact with the other member.

When the center axis of the bar member is orthogonal to the rear, an end of the stand 124 opposite to the other end thereof which is a rotation axis protrudes from the rear of the cabinet 122. When the rear side of the cabinet 122 is brought into contact with the other member in a state where part of the stand 124 protrudes from the concave portion of the cabinet 122, the stand 124 and the end face opposite to the projector 34 side of the rear of the cabinet 122 contact and support the other member. The stand 124 protruding from the rear and the cabinet 122 are supported, so that the rear of the cabinet 122 is supported at a predetermined angle with respect to the other member.

The switch member 126 is disposed on the end face of the end of the stand 124 on the side not supported by the cabinet 122, and detects whether it is in contact with the other member. The rest of the configuration of the switch member 126 is the same as the configuration of the switch member 112 of the mobile electronic device 100 except for its disposed position, and therefore detailed explanation thereof is omitted. The switch member 126 is caused to come in contact with any other member and is thereby applied with an external force, so that the switch member 126 is moved to the inner side of the stand 124 to become an ON state. The mobile electronic device 120 is also configured to detect whether it is in contact with the other member by the switch member 126, and project an image only when the switch member 126 is in contact with the other member while the stationary mode is selected.

In this way, even if the stand 124 is provided as is in the mobile electronic device 120, the setting can be performed in such a manner that the light is emitted only when the stand 124 is in contact with the other member, the light can be prevented from entering person's eyes due to a sudden change of the light emission direction, thus further reducing the possibility that the person is dazzled by the emitted light. In addition, when the stationary mode is selected, it is possible to set so that the image is projected only when the mobile electronic device is placed on the other member in a predetermined direction, thus projecting the image in its appropriate orientation.

The mobile electronic device 120 is provided with the stand 124, so that the light emitted from the projector 34 can be prevented from being projected to any other member (desk, etc.). In other words, the image can be irradiated in an upward direction at a predetermined angle toward the upper side in the vertical direction than the horizontal direction, and therefore a portion near the rear side of the projected image can be prevented from being projected to the other member. Moreover, by providing the stand 124 and providing the switch member 126 on the stand 124, the light can be projected only when it is placed on the other member by using the stand 124. This enables the mobile electronic device 120 to be configured so that the light is emitted only when it is placed thereon in a predetermined direction and a predetermined attitude.

Figure 8:
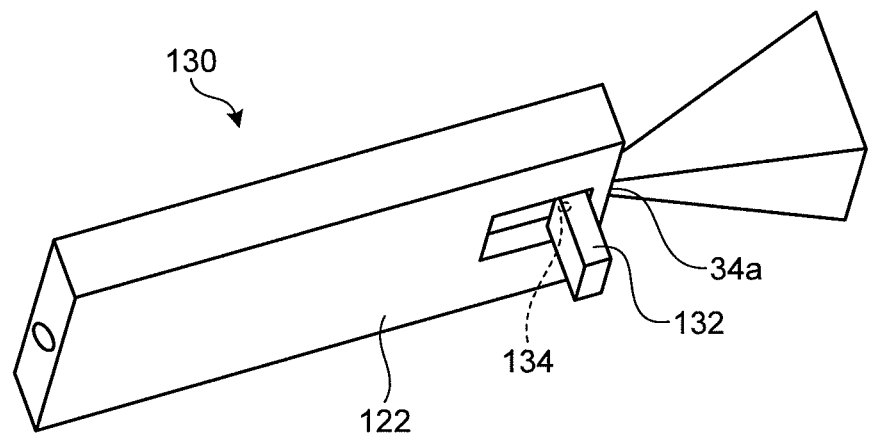
FIG. 8 is a perspective view illustrating a schematic configuration of another embodiment of the mobile electronic device.

In the embodiment, the switch member 126 is provided on the face of the stand 124 where it comes in contact with the other member, however, the present invention is not limited thereto. Thus, the provision position is not particularly limited if it is possible to detect that the cabinet of the mobile electronic device is in contact with the other member. FIG. 8 is a perspective view illustrating a schematic configuration of another embodiment of the mobile electronic device. A mobile electronic device 130 as illustrated in FIG. 8 is provided with a switch member 134 between the cabinet 122 and a stand 132. Here, the stand 132 has a structure so as to move to a concave portion side of the cabinet 122 when force is applied in a direction from the face in contact with the other member toward the concave portion of the cabinet 122. If the stand 132 moves to the concave portion side of the cabinet 122, the switch member 134 is sandwiched by the cabinet 122 and the stand 132, and becomes pressed thereby. The switch member 134 detects whether it is pressed by the cabinet 122 and the stand 132. When it is detected that the switch member 134 is pressed by the cabinet 122 and the stand 132, the switch member 134 outputs an ON-state signal.

In this way, even if the switch member 134 is not provided in a location in direct contact with the other member, if it is possible to detect, through the cabinet 122 and the stand 132, that the mobile electronic device 130 is placed on the other member at a predetermined attitude, the mobile electronic device 130 can be controlled in the same manner as that of the mobile electronic device 100 and the mobile electronic device 120, thus obtaining the same effect as that of the mobile electronic device 100 and the mobile electronic device 120.

Figure 9:
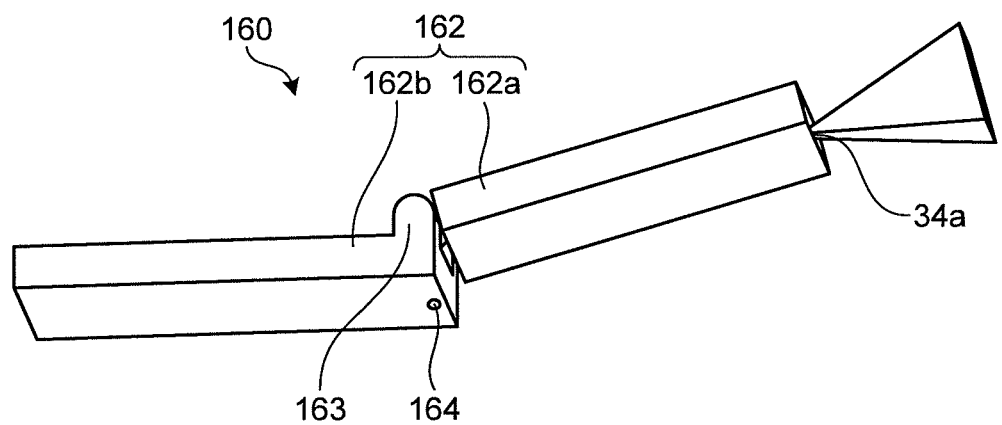
FIG. 9 is a perspective view illustrating a schematic configuration of another embodiment of the mobile electronic device.

A case where all the cabinets of the mobile electronic devices are a straight form has been explained as an example, however, a case of other forms is also the same as above. It will be explained below together with a specific example. First, FIG. 9 is a perspective view illustrating a schematic configuration of another embodiment of the mobile electronic device. A mobile electronic device 160 as illustrated in FIG. 9 is a so-called folding mobile electronic device, and a cabinet 162 is formed with a first cabinet 162a and a second cabinet 162b. The first cabinet 162a and the second cabinet 162b are coupled to each other in an openable/closable state through a hinge 163. Specifically, the first cabinet 162a and the second cabinet 162b mutually pivot around the hinge 163, so that these cabinets can pivot in a direction of mutually separating from each other and a direction of mutually approaching each other. When the first cabinet 162a and the second cabinet 162b pivot in the direction of mutually separating from each other, the mobile electronic device 160 opens, and when the first cabinet 162a and the second cabinet 162b pivot in the direction of mutually approaching each other, then the mobile electronic device 160 closes. In addition, the projector 34 is provided on the end opposite to the end of the first cabinet 162a where the hinge 163 thereof is provided.

A switch member 164 is provided on a face of the second cabinet 162b that is opposite to a face facing the first cabinet 162a in the closed state, or on a face corresponding to the rear. The structure of the switch member 164 is the same as that of the switch member 112, and detailed explanation thereof is therefore omitted.

As is the mobile electronic device 160, even if the mobile electronic device is a folding type, a switch member for detecting whether the mobile electronic device 160 is in contact with any other member is provided, and the same operation as that of the mobile electronic devices 100 and 120 is performed, thus obtaining the same effect as that of the mobile electronic devices 100 and 120.

Figure 10:
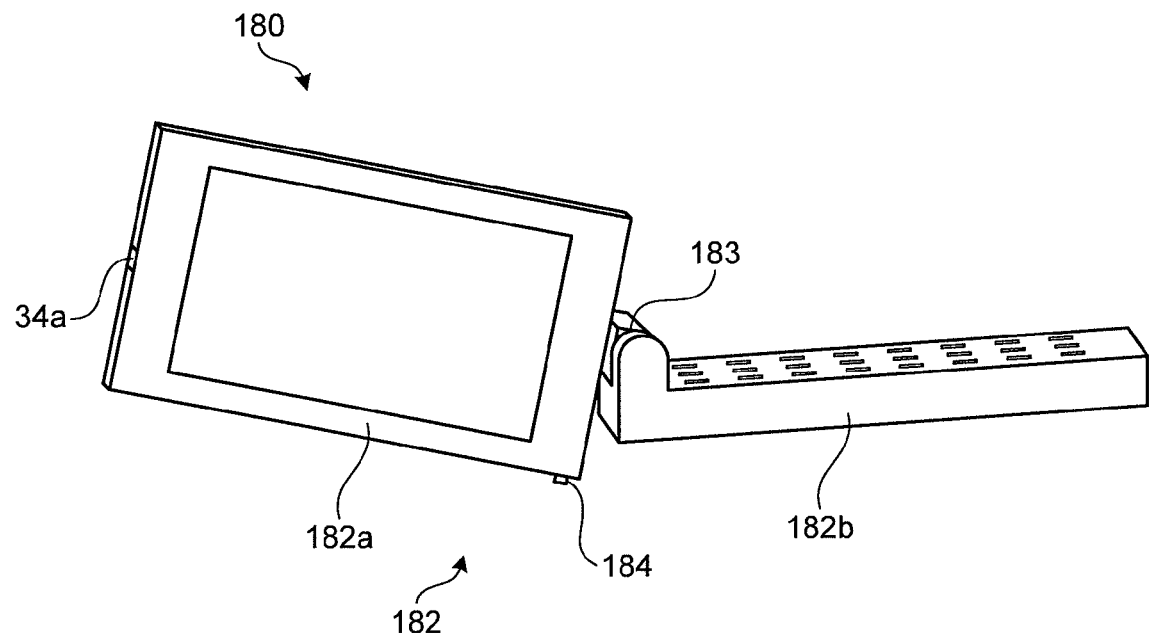
FIG. 10 is a perspective view illustrating a schematic configuration of another embodiment of the mobile electronic device.
Figure 11A:
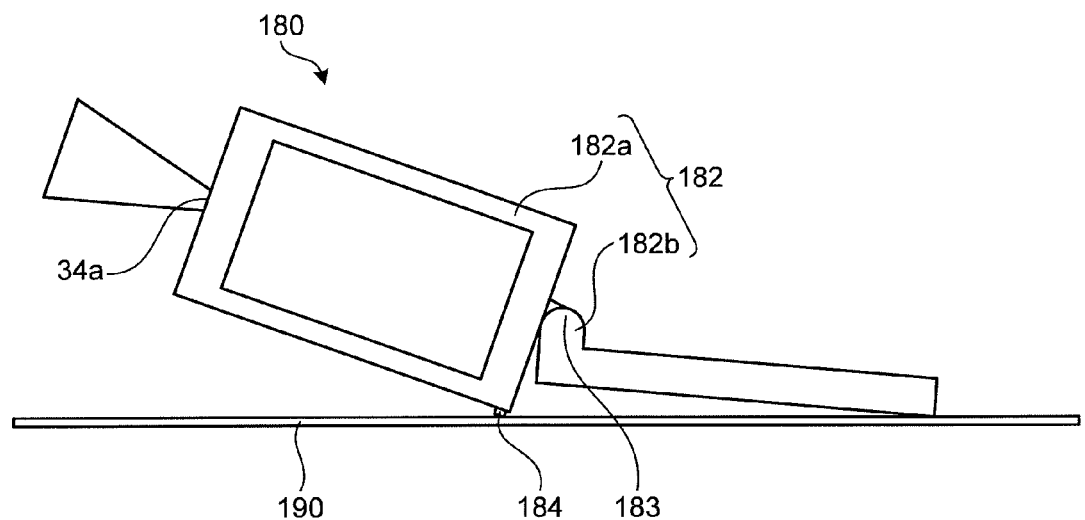
FIG. 11A is an explanatory diagram for explaining the operation of the mobile electronic device as illustrated in FIG. 10.
Figure 11B:
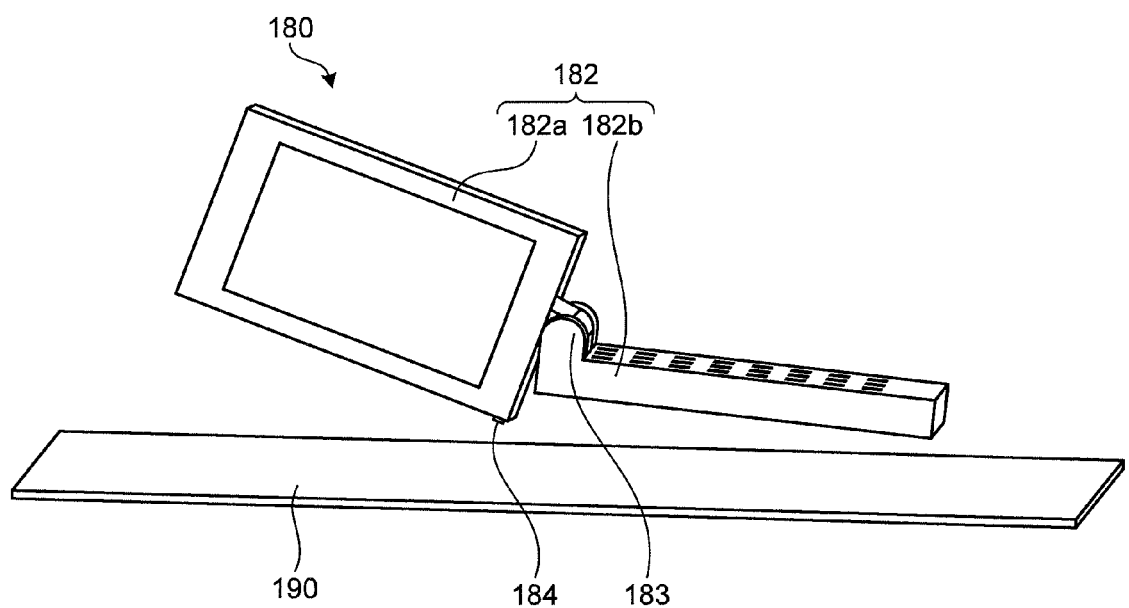
FIG. 11B is an explanatory diagram for explaining the operation of the mobile electronic device as illustrated in FIG. 10.

FIG. 10 is a perspective view illustrating a schematic configuration of another embodiment of the mobile electronic device. FIG. 11A is an explanatory diagram for explaining the operation of the mobile electronic device as illustrated in FIG. 10, and FIG. 11B is an explanatory diagram for explaining the operation of the mobile electronic device as illustrated in FIG. 10. A mobile electronic device 180 as illustrated in FIG. 10 is a so-called folding mobile electronic device with a biaxial hinge, and a cabinet 182 thereof is formed with a first cabinet 182a and a second cabinet 182b. The first cabinet 182a and the second cabinet 182b are coupled to each other through a hinge 183. The hinge 183 relatively rotates the first cabinet 182a and the second cabinet 182b by the two pivotal axes in an opening/closing direction and in a twist direction. Here, the twist direction is a direction that is orthogonal to the rotation axis in the opening/closing direction and rotates based on a line, as an axis, extending from an end connected with the hinge 183 of the first cabinet 182a toward the front end thereof. Specifically, first, the first cabinet 182a and the second cabinet 182b are structured so that these cabinets mutually pivot around the hinge 183 and can pivot in the direction of mutually separating from each other and the direction of mutually approaching each other. When the first cabinet 182a and the second cabinet 182b pivot in the direction of mutually separating from each other, the mobile electronic device 180 opens, while when the first cabinet 182a and the second cabinet 182b pivot in the direction of mutually approaching each other, the mobile electronic device 180 closes. Moreover, in the first cabinet 182a and the second cabinet 182b, the face where the display 12 of the first cabinet 182a is formed and the face where the operation keys 13 of the second cabinet 182b are provided rotate in the direction of mutually twisting from each other based on a line, as a rotation axis, passing through the center of the hinge 183 and being orthogonal to the rotation axis in the rotation direction.

The projector 34 is provided in the end on the opposite side to the end where the hinge 183 of the first cabinet 182a is provided. Moreover, a switch member 184 is provided in the side face of the first cabinet 182a or in the end on the hinge 183 side of the face which is an outer periphery upon its rotation in the twist direction. The structure of the switch member 184 is the same as that of the switch member 112, and thus detailed explanation thereof is omitted.

As illustrated in FIG. 10, FIG. 11A, and FIG. 11B, the mobile electronic device 180 projects an image in the stationary mode when the mobile electronic device 180 is opened by rotating the first cabinet 182a and the second cabinet 182b of the mobile electronic device 180 in the opening/closing direction around the hinge 183, and relatively rotates the first cabinet 182a and the second cabinet 182b around the hinge 183 in the twist direction, and when the face where the switch member 184 is formed becomes substantially parallel to the rear of the second cabinet 182b or in the case of the state as illustrated in FIG. 10.

Therefore, as illustrated in FIG. 11A, when the mobile electronic device 180 becomes a state in which the portion where the switch member 184 of the first cabinet 182a is provided is in contact with any other member, basically, a state in which the portion where the switch member 184 of the first cabinet 182a is provided and a part of the second cabinet 182b are in contact with any other member 190, the switch member 184 becomes the ON state, the light is emitted from the projector 34, and the image is projected. In addition, as illustrated in FIG. 11B, when the mobile electronic device 180 becomes floated and the switch member 184 is not in contact with the other member 190, then the switch member 184 becomes an OFF state, and emission of the light from the projector 34 is stopped.

As is the mobile electronic device 180, even if the mobile electronic device is a folding type with the biaxial hinge, a switch member for detecting whether the mobile electronic device 180 is in contact with the other member is provided, and the same operation as that of the mobile electronic devices 100, 120, and 160 is performed, thus obtaining the same effect as that of the mobile electronic devices 100, 120, and 160. Moreover, by providing the switch on the first cabinet side, the mobile electronic device is rotated a certain amount in the twist direction, so that an image can be projected only when it is placed on the other member, and a position of the first cabinet in the twist direction can be set as a predetermined position. In this way, the image to be projected from the projector 34 can be projected in an appropriate orientation even if an angle of the first cabinet 182*a* in the twist direction is not detected. It should be noted that the technical matters described in the various embodiments may be mutually combined with each other.

Figure 12:
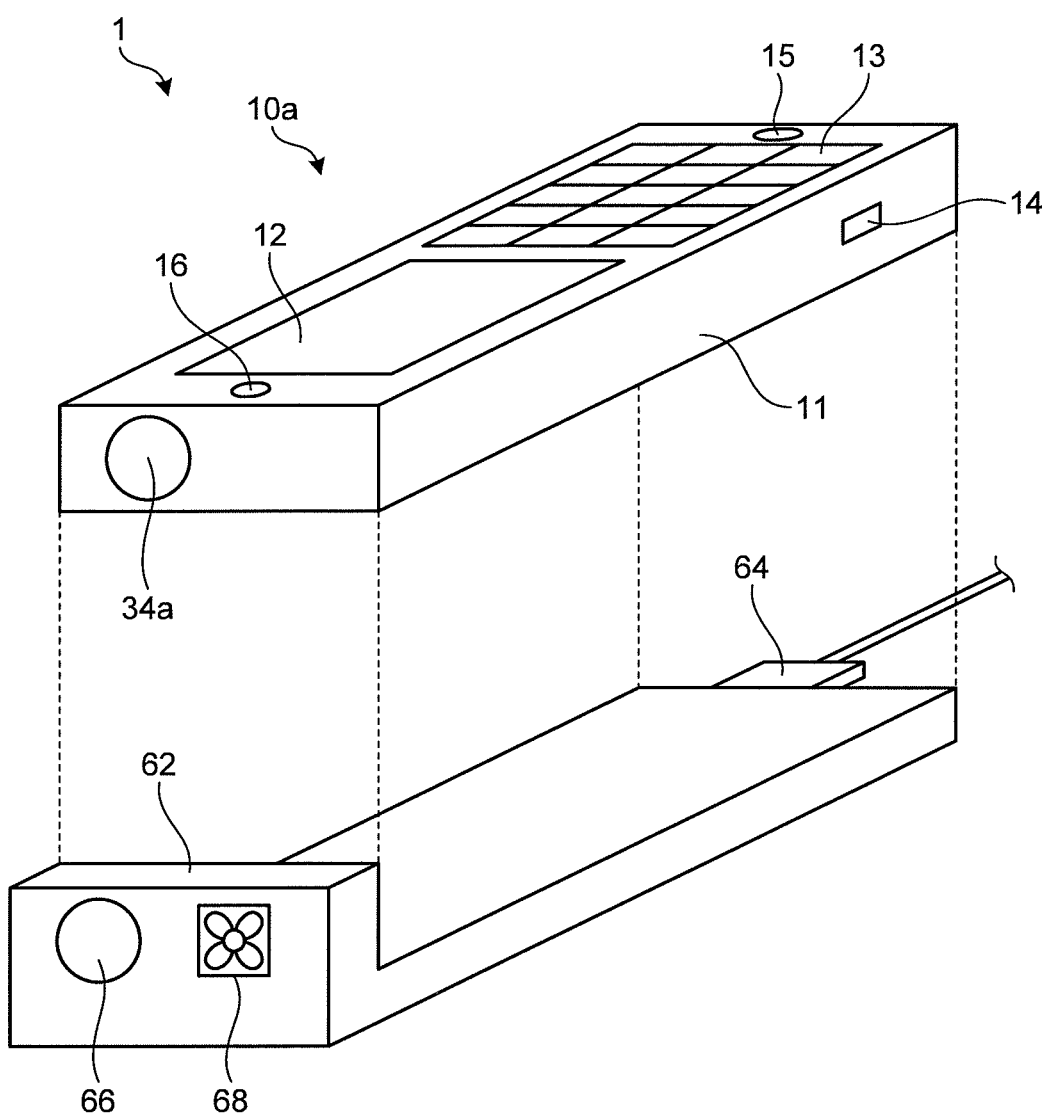
FIG. 12 is a perspective view illustrating a schematic configuration of one embodiment of a mobile system including a mobile electronic device.

A mobile system including a mobile electronic device will be explained next. First, an external configuration of the mobile system including the mobile electronic device will be explained with reference to FIG. 12. FIG. 12 is a perspective view illustrating a schematic configuration of one embodiment of the mobile system including the mobile electronic device. A mobile system 1 includes a mobile electronic device 10*a*, a charging base 62 being a base that can support the mobile electronic device 10*a*, and an external power terminal 64 connected to the charging base 62 at one end thereof and connected to an external power supply such as an AC adapter or an outlet at the other end thereof. The mobile system 1 is configured so that when the mobile electronic device 10*a* is placed on a predetermined position of the charging base 62 and the mobile electronic device 10*a* is supported by the charging base 62, then the power is supplied from the external power to the mobile electronic device 10*a* through the external power terminal 64 and the charging base 62, to charge the mobile electronic device 10*a* or to supply power to the mobile electronic device 10*a*. The mobile electronic device 10*a* has substantially the same configuration as that of the mobile electronic device 10 as illustrated in FIG. 1. Therefore, in the mobile electronic device 10*a*, the same reference signs are assigned to components having the same configuration as these of the mobile electronic device 10, and detailed explanation thereof is omitted.

The mobile electronic device 10*a* is a mobile phone provided with a wireless communication function. The mobile electronic device 10*a* is a straight mobile phone including one box-shaped cabinet 11 that stores units inside thereof. The cabinet 11 is provided with the display 12, the operation keys 13, the dedicated key 14, the microphone 15, the receiver 16, and the projector 34.

Figure 13:
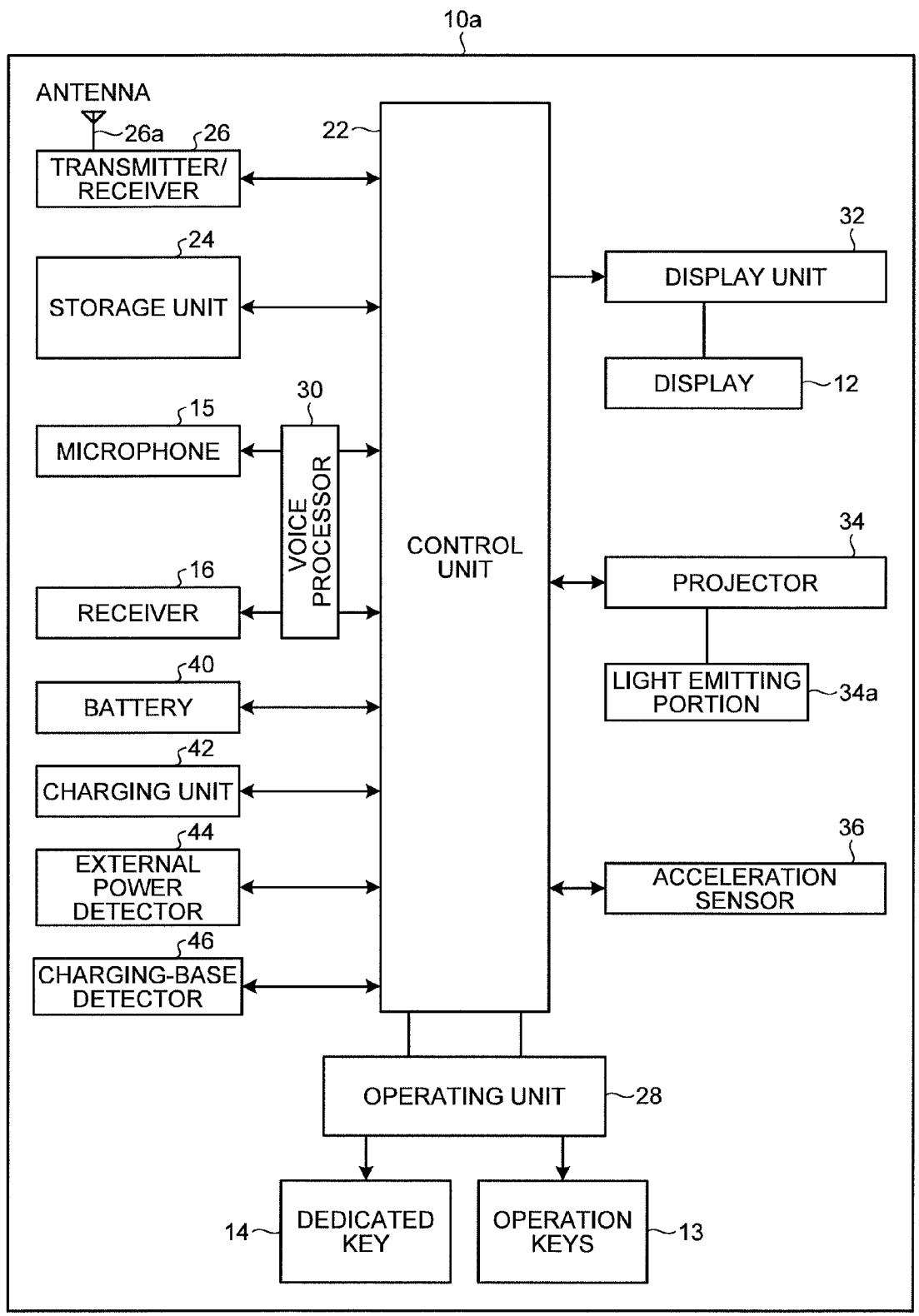
FIG. 13 is a block diagram illustrating a schematic configuration of functions of the mobile electronic device as illustrated in FIG. 12.

FIG. 13 is a block diagram illustrating a schematic configuration of functions of the mobile electronic device as illustrated in FIG. 12. As illustrated in FIG. 13, the mobile electronic device 10*a* includes the control unit 22, the storage unit 24, the transmitter/receiver 26, the operating unit 28, the voice processor 30, the display unit 32, the projector 34, the acceleration sensor 36, a battery 40, a charging unit 42, an external power detector 44, and a charging-base detector 46. The mobile electronic device 10 is also provided with the battery 40 or the like although explanation thereof is omitted in the above. The control unit 22, the storage unit 24, the transmitter/receiver 26, the operating unit 28, the voice processor 30, the display unit 32, the projector 34, the acceleration sensor 36 are configured in the same manner as these of the mobile electronic device 10, and thus the explanation thereof is omitted.

The battery 40 is a chargeable secondary battery, which supplies charged power to the control unit 22 to operate the units of the mobile electronic device 10*a*. The charging unit 42 controls a charging operation based on a remaining amount of the power in the battery 40 and results of detection by the external power detector 44 and by the charging-base detector 46.

The external power detector 44 is a sensor that detects whether the power can be supplied from the external power terminal 64 to the mobile electronic device 10*a* including the battery 40, or whether the external power terminal 64 connected to an external power supply is connected to the mobile electronic device 10*a*. As the external power detector 44, for example, a sensor that is provided in an electric cable between the external power terminal 64 and the battery 40 and detects current and/or voltage passing through the electric cable can be used. The external power detector 44 sends the result of detection to the control unit 22 and the charging unit 42. The external power detector 44 detects whether the power is supplied from the external power supply to the mobile electronic device 10*a* including the battery 40 regardless of power supply paths. Therefore, the external power detector 44 detects whether the power is supplied from the external power supply to the mobile electronic device 10*a* including the battery 40, regardless of whether the power is supplied through the external power terminal 64 and the charging base 62, whether the external power terminal 64 is directly connected to the mobile electronic device 10*a* and external power is supplied, whether the external power supply acquires power through the AC adapter and the outlet, etc., and whether the external power supply acquires power from a battery.

The charging-base detector 46 detects whether the cabinet 11 is placed (or supported by) on a predetermined position of the charging base 62 at a predetermined attitude. As the charging-base detector 46, a contact sensor or the like for detecting that the cabinet 11 and the charging base 62 are in contact with each other can be used. It is preferable in the charging-base detector 46 that a concave-convex portion of the cabinet 11 and a concave-convex portion of the charging base 62 are in contact with each other and detects the contact of the both members at a position where the concave and the convex are engaged with each other. With this feature, the charging-base detector 46 can determine whether the cabinet 11 is supported by any other member such as a desk, or is supported by the charging base 62, and can determine whether the cabinet 11 is supported at a predetermined attitude. The mobile electronic device 10*a* is basically configured in the above manner.

Figures 14, 15:
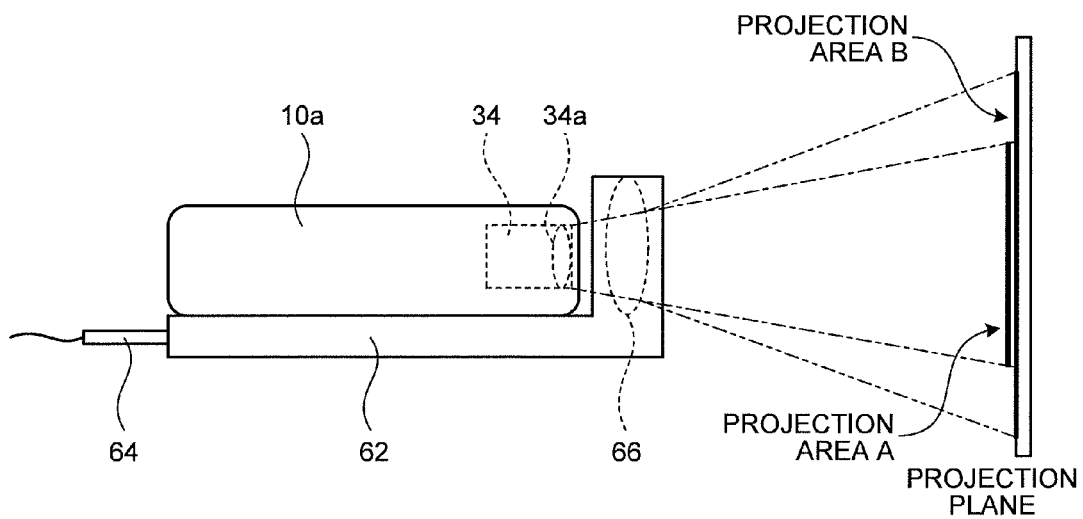
FIG. 14 is an explanatory diagram illustrating another state in which an image is displayed by the mobile electronic device as illustrated in FIG. 12.
FIG. 15 is an explanatory diagram illustrating one example of controls in the mobile electronic device.

Referring back to FIG. 12, the explanation of the mobile system 1 is continued. The charging base 62 is a support member for supporting the mobile electronic device 10*a*. The charging base 62 is provided with a lens unit 66 and a fan 68. The lens unit 66 is provided on a position facing the light emitting portion 34*a* of the mobile electronic device 10*a* when the mobile electronic device 10*a* is placed thereon. The lens unit 66 is a magnifying lens for further magnifying a wide field of view (illumination angle of view) of light emitted from the light emitting portion 34*a*. The lens unit 66 is explained below with reference to FIG. 14. FIG. 14 is an explanatory diagram illustrating another state in which an image is displayed by the mobile electronic device as illustrated in FIG. 12. As illustrated in FIG. 14, when the mobile electronic device 10*a* is placed on the charging base 62, the light emitting portion 34*a* of the projector 34 and the lens unit 66 face each other. An image is projected by the projector 34 in this state, and, as illustrated in FIG. 14, the image can be projected to a range of a projection area B which is a wider area than a projection area (irradiation range) A of the light projected when the light is caused not to pass through the lens unit 66 (or when it is assumed that there is no lens unit 66). In other words, by causing the light to pass through the lens unit 66, a larger image can be projected onto the projection plane (irradiation plane). As the lens unit 66, a lens with fixed refractive index and focal length may be used, however, it is preferable to use a zoom lens capable of changing the refractive index and the focal length. By using the zoom lens, an irradiation area of the light can be controlled.

The fan 68 is disposed near the lens unit 66, sends wind to the projector 34 of the mobile electronic device 10*a* placed on the predetermined position of the charging base 62, and cools down the projector 34. The fan 68 may absorb air near the projector 34, discharge the air in a direction away from the mobile electronic device 10a, and change the air around the projector 34 to cool down the projector 34. The fan 68 may apply the air to the projector 34 to cool down the projector 34.

The external power terminal 64 is a terminal connected to the charging base 62 at one end thereof and connected to an external power supply at the other end thereof. In the embodiment, the external power terminal 64 is connected to the charging base 62, however, the external power terminal 64 can be directly connected to the mobile electronic device 10a. Specifically, by providing a terminal for connecting the mobile electronic device 10a to the external power terminal 64 in the cabinet 11, the external power terminal 64 and the mobile electronic device 10a can be connected to each other without through the charging base 62. The mobile system 1 is configured in the above manner.

Next, the operations of the mobile system 1 and the mobile electronic device 10a are explained with reference to FIG. 15. FIG. 15 is an explanatory diagram illustrating one example of controls in the mobile electronic device. In the explanatory view illustrated in FIG. 15, items in the horizontal direction indicate statuses of the mobile electronic device, and items in the vertical direction indicate control modes of the projector. In the explanatory view illustrated in FIG. 15, when the mobile electronic device is in the respective statuses, a control mode that can be selected is indicated by circle mark and a control mode that cannot be selected is indicated by cross mark.

The items indicating statuses of the mobile electronic device will be explained below. "When driven by battery" indicates a status in which a connection of the mobile electronic device to the external power supply is not detected by the external power detector 44 and a contact thereof with the charging base 62 is not detected by the charging-base detector 46. In other words, it is a status in which the mobile electronic device 10a is not placed on the charging base 62, the power is not supplied externally, and the units are driven by the power charged in the battery 40. "When connected to external power supply" indicates a status in which a connection of the mobile electronic device to the external power supply is detected by the external power detector 44 but a contact thereof with the charging base 62 is not detected by the charging-base detector 46. In other words, it is a status in which the mobile electronic device 10a is not placed on the charging base 62 and the units are driven by the power supplied externally. "When placed on charging base" is a status in which a connection of the mobile electronic device to the external power supply is detected by the external power detector 44 and a contact thereof with the charging base 62 is detected by the charging-base detector 46. In other words, it is a status in which the mobile electronic device 10a is placed on the charging base 62 and the units are driven by the power supplied externally.

Control modes of the projector as illustrated in FIG. 15 will be explained next. First, a base mode includes the mobile mode and the stationary mode. The mobile mode (first mode) is a control mode which is assumed that the operator uses the projector 34 while holding the mobile electronic device 10a (cabinet 11) in hand, and the stationary mode (second mode) is a control mode which is assumed that the operator uses the projector 34 when the mobile electronic device 10a (cabinet 11) is placed on a desk, a table, or a charging base. The control method of the mobile mode and the stationary mode will be explained later using specific examples.

A control mode related to safety includes an automatic control mode and an active control mode. The automatic control mode is a mode for controlling projection of the projector 34 based on a control condition preset by the control unit 22. The active control mode is a mode for performing projection of the projector 34 only when the operator inputs an operation. In other words, the active control mode is a control mode for projecting an image by the projector 34 only when the user performs an active operation (or when the user enters a signal for projection permission). For the mobile mode and the stationary mode explained in the following, the mobile mode includes the active control mode, and the stationary mode includes the automatic control mode.

A control mode related to a function is one in which a power consumption is larger than that of other control modes, or is one required for safety higher than that of other control modes, which include, for example, a theater mode, a projective alarm mode, a photo frame mode, and a fan mode.

The theater mode is a control mode for increasing a light amount to be emitted from the projector 34 higher than the other modes, specifically, higher than that in a control mode for projecting an image without specific adjustment of the light amount. In the theater mode, a brighter image can be projected.

The projective alarm mode is a control mode for outputting alarm at a preset time for waking up, letting the operator know a departure time, or the like, in such a manner that sound or vibration is generated and light is output from the projector 34. How to control the projective alarm mode will be explained later.

The photo frame mode is a control mode for causing the projector 34 to sequentially project a plurality of image data stored in the storage unit 24 or the like.

The fan mode is a control mode for driving the fan 68 to cool down the projector 34 of the mobile electronic device 10a. By providing a terminal for transmitting/receiving information in between the mobile electronic device 10a and the charging base 62, the control unit 22 can control the operation of the fan 68. The control of the fan 68 may be implemented by providing another control unit in the charging base to control the fan by the another control unit.

The base mode and the control mode for the safety are respectively required to select one control mode out of the two control modes (that is, both the mobile mode and the stationary mode cannot be concurrently driven), however, in the mode for the function, a plurality of control modes can be driven.

As illustrated in FIG. 15, the mobile electronic device 10a switches between selectable control modes depending on "when driven by battery", "when connected to external power supply", and "when placed on charging base". Specifically, when it is driven by the battery, only the mobile mode and the active control mode can be selected, and the other control modes cannot be selected. When it is connected to the external power supply, the base mode and the control mode for the safety can be selected, however, the control modes for the functions cannot be selected. When it is placed on the charging base, all the base mode, the control mode for the safety, and the control modes for the functions can be selected.

In this way, the control unit 22 detects the status of the mobile electronic device 10a based on the results of detection by the external power detector 44 and by the charging-base detector 46, and by switching between the selectable control modes based on the results of detection, the control unit 22 can appropriately switch between the operations of the projector 34 according to the status of the mobile electronic device 10a.

Specifically, the control modes for the functions can be selected only when the mobile electronic device is placed on the charging base, which allows various controls while maintaining high safety. Here, when placed on the charging base, the power is supplied externally and the mobile electronic device is supported by the charging base 62. Therefore, even if a selected control mode requires large power consumption, the charging base 62, and the suppression of changes in a projection position and a direction of an image, the mobile electronic device can be appropriately operated while maintaining high safety. In addition, it is set so that these modes cannot be selected except when placed on the charging base, and the mobile electronic device 10a can thereby be safely used for a long time.

For example, in the theater mode, the light amount is increased and the power consumption thereby becomes large. However, because the power is supplied externally, the image can be continuously projected even if the power consumption is large. In addition, because the light amount can be more increased and the image can be projected through the lens unit 66, a larger and brighter image can be projected. Moreover, because the mobile electronic device is supported by the charging base 62, the possibility that the projection direction changes is low, and therefore the possibility that the light emitted from the projector 34 is suddenly irradiated toward a person can be reduced. Thus, high safety can be maintained even if the light amount is increased and the illumination angle of view is made larger.

In the projective alarm mode, also, by emitting the light from the projector 34 when the alarm function is operated, in addition to sound and vibration, stimulus is given to eyesight, so that the operator can more surely notice the alarm. A message is displayed, and this message allows the operator to instantly recognize the content that is notified by the alarm. By setting so that the projective alarm mode can be executed only when the mobile electronic device is placed on the charging base, the projection position can be made difficult to be displaced, thus maintaining a high degree of safety.

The photo frame mode is a mode in which images are continuously projected until the operator stops the mode or the mode is ended by the setting. However, by supplying the power from the external power supply, the image can be continuously projected for a long time regardless of the remaining amount of the battery. This mode can be selected only when the mobile electronic device is placed on the charging base, and therefore it is possible to prevent that the mobile electronic device 10a is made unusable caused by consumption of the power stored in the battery. By setting so that the photo frame mode can be executed only when the mobile electronic device is placed on the charging base, the projection position can be made difficult to be displaced, thus maintaining a high degree of safety even when the light is continuously projected for a long time.

In the fan mode, the projector 34 can be cooled down, and even if an image is projected with a high output for a long time, it is possible to prevent performance of the projector 34 from decreasing caused by high temperature of the projector 34. The fan mode is preferably operated together with the other function modes. It should be noted that the control modes for the functions are not limited thereto, thus using various control modes.

One example of the alarm operation will be explained next with reference to FIG. 16. FIG. 16 is a flowchart illustrating one example of the operation of the mobile electronic device. First, it is set in the mobile electronic device 10a so that an alarm operation is performed at a predetermined time. The control unit 22 acquires time information, detects that it is xx seconds before the alarm operation, as Step S102, and determines what status the mobile electronic device 10a is in, as Step S104. That is, the control unit 22 determines, as Step S104, in which status of "when driven by battery", "when connected to external power supply", and "when placed on charging base" the mobile electronic device 10a is. The control unit 22 may determine, as Step S104, whether the mobile electronic device 10a is in the status of "when placed on charging base" or not.

At Step S104, when it is determined that the status is "when driven by battery" and "when connected to external power supply", in other words, that the status is not "when placed on charging base", the control unit 22 determines, as Step S106, that no function mode of the projector is required, and proceeds to Step S110. In other words, the control unit 22 determines that the function mode cannot be selected (specifically, it is impossible to activate the projective alarm mode), and proceeds Step S110.

At Step S104, when it is determined that the status of the mobile electronic device 10a is "when placed on charging base", in other words, that the status is not "when driven by battery" and "when connected to external power supply", the control unit 22 determines, as Step S108, whether the function is the projective alarm mode. In other words, the control unit 22 determines whether it is set so that the alarm operation is performed in the projective alarm mode.

At Step S108, when it is determined that the projective alarm mode is not set (No), the control unit 22 proceeds to Step S110. When it is determined as No at Step S108 or the process at Step S106 is ended, the control unit 22 performs normal alarm operation, as Step S110. The normal alarm operation mentioned here represents a notifying operation to a user using at least one of sound, vibration, and indication by the display unit 32. The control unit 22 performs the normal alarm operation at Step S110, and then ends the process.

At Step S108, when it is determined that the projective alarm mode is set (Yes), the control unit 22 activates the projector 34 as Step S112, and performs a projective alarm operation as Step S114. The projective alarm operation mentioned here represents a notifying operation to the user by projecting an image from the projector 34, in addition to the notifying operation to the user using at least one of the sound, the vibration, and the indication by the display unit 32. Here, the image projected from the projector 34 can be various images. For example, if the function is a wake-up function, then a time is displayed, or the light may be simply irradiated. If the function is an alarm for notifying the user of a departure time, then a preset message or schedule may be displayed. The control unit 22 performs the projective alarm operation at Step S114, and then ends the process.

The mobile electronic device 10a switches between the control modes to be selected according to the status of the mobile electronic device in the above manner, and this enables an image to be projected from the projector appropriately and safely.

As explained above, when the mobile electronic device is driven by the battery, the stationary mode cannot be selected and only the mobile mode can be selected, thus reducing the possibility that a person is suddenly dazzled with the emitted light when it is driven by the battery and the movement is not restricted by any other member.

In the embodiments, in the cases of "when connected to external power supply" and "when placed on charging base", both the mobile mode and the stationary mode can be selected, however, the mode is not limited thereto, thus any one of the modes may be set automatically. In this way, by automatically switching between the modes, a troublesome operation for the operator can be reduced.

When the power is to be detected, the external power detector 44 preferably identifies whether the power is supplied from a commercial power supply such as an AC adapter provided, from a dry-cell battery, or from a battery of PC or the like through USB. If these can be identified in this way, it is preferable to change a control mode that can be selected depending on the case where the power is supplied from the commercial power supply or on the case where the power is supplied from any other power supply. Specifically, when the power is supplied from the commercial power supply, it is preferably set so that more control modes can be selected. In this way, selectable control modes can be changed depending on whether the mobile electronic device is connected to a movable power supply such as a dry-cell battery or the mobile electronic device is connected to the commercial power supply, whose movement range is restricted by a cord. The safety and operability can thereby be controlled according to the status of the mobile electronic device, thus more enhancing the safety and the operability.

In the embodiments, the fan 68 is provided in the charging base 62, however, any means may be used if it can cool down the projector 34 when the mobile electronic device 10*a* is placed on the charging base 62, so that various types of cooling units can be used. For example, a water-cooling mechanism for flowing cooling water to an area of the charging base in contact with the projector may be used. Moreover, a heat pipe is used to transfer the heat of the projector, so that a fan or the like may be provided at a location apart from the projector. In the embodiments, because the mobile electronic device 10*a* can be used more functionally, the lens unit 66 and the fan 68 are provided in the charging base (dedicated base) 62, however, the present invention is not limited thereto, and thus the lens unit and the fan are not necessarily provided. When the lens unit is not provided therein, the charging base (dedicated base) is necessary to be formed in such a manner that the light projected from the projector is not blocked. The fan and the lens unit may be provided in the mobile electronic device.

In the embodiments, the charging base 62 as a dedicated base capable of connecting to the external power terminal and supplying the power from the external power terminal to the mobile electronic device 10*a* is used, however, the present invention is not limited thereto. For example, the external power terminal and the dedicated base may be separately connected to the mobile electronic device, and the mobile electronic device may be placed on the dedicated base.

INDUSTRIAL APPLICABILITY

As explained above, the mobile electronic device and the mobile system according to the present invention are suitable for projecting various images.

The invention claimed is:
1. A mobile electronic device, comprising:
an image projector configured to project an image; and
a control unit configured to control a projection operation performed by the image projector, wherein
the control unit is configured to select either one of a first mode and a second mode,
in the first mode, the control unit is configured to
cause the image projector to project the image with a first light intensity while a preset operation is being performed on the mobile electronic device, and
cause the image projector not to project the image, or to project the image with a second, lower light intensity, while the preset operation is not being performed on the mobile electronic device, and
in the second mode, the control unit is configured to cause the image projector to project the image regardless of whether the preset operation being performed on the mobile electronic device or not.

2. The mobile electronic device according to claim 1, further comprising an input unit configured to receive the preset operation, wherein
the control unit, when the first mode is selected, is configured to
cause the image projector to project the image with the first light intensity while the preset operation is being received by the input unit, and
cause the image projector not to project the image, or to project the image with the second, lower light intensity, while the preset operation is not being received by the input unit, and
the control unit, when the second mode is selected, is configured to cause the image projector to project the image regardless of whether the preset operation is being received by the input unit or not.

3. The mobile electronic device according to claim 2, wherein
the input unit comprises a key or a touch panel of the mobile electronic device, and
the preset operation is pressing the key or touching the touch panel.

4. The mobile electronic device according to claim 1, wherein the control unit is configured to select either one of the first mode and the second mode based on an instruction input by an operator.

5. The mobile electronic device according to claim 1, further comprising:
a cabinet in which the image projector is incorporated; and
a status detector configured to detect whether the cabinet is supported by a base, wherein
the control unit, when it is detected by the status detector that the cabinet is supported by the base, is configured to select the second mode.

6. The mobile electronic device according to claim 1, further comprising:
a cabinet in which the image projector is incorporated; and
an acceleration sensor configured to detect an acceleration acting on the cabinet, wherein
the control unit, when the acceleration detected by the acceleration sensor exceeds a predetermined value, is configured to select the first mode.

7. The mobile electronic device according to claim 6, wherein
the control unit is configured to further detect a frequency of the acceleration, and
when it is determined that the frequency of the acceleration is caused by shakiness of hands, the control unit is configured to select the first mode.

8. The mobile electronic device according to claim 1, further comprising
a cabinet in which the image projector is incorporated; and
a contact detector configured to detect whether a predetermined face of the cabinet is in contact with an external member, wherein
the control unit, when the second mode is selected and when it is detected by the contact detector that the predetermined face of the cabinet is in contact with the external member, is configured to cause the image projector to project the image.

9. The mobile electronic device according to claim 8, wherein the contact detector is a force detection mechanism configured to mechanically detect a force applied thereto caused by a contact with the external member.

10. The mobile electronic device according to claim 8, further comprising an orientation detector configured to detect an orientation of the cabinet, wherein
the control unit, when the first mode is selected and when it is detected by the contact detector that the predetermined face of the cabinet is in contact with the external member, is configured to cause the image projector to project the image in a direction such that an upper portion of the image corresponds to an upper side in a vertical direction based on the orientation of the cabinet detected by the direction detector.

11. The mobile electronic device according to claim 10, wherein the orientation detector has an acceleration sensor configured to detect an acceleration acting on the cabinet and a calculator configured to calculate a direction, by the acceleration sensor, on which gravity acts on the cabinet.

12. The mobile electronic device according to claim 1, further comprising:
a power unit configured to supply power to the image projector and the control unit, the power unit including a battery configured to be charged by an external power supply; and
a charging detector configured to detect whether power is supplied externally to the power unit, wherein
the second mode is selectable only when it is detected by the charging detector that the power is supplied externally to the power unit.

13. The mobile electronic device according to claim 12, wherein the control unit is configured to control power consumption of the image projector in the second mode to be greater than that in the first mode.

14. The mobile electronic device according to claim 12, wherein the control unit is configured to control the light intensity of the image projector in the second mode to be greater than in the first mode.

15. The mobile electronic device according to claim 12, wherein the control unit is configured to control the image projector to continuously project images in the second mode.

16. The mobile electronic device according to claim 12, further comprising an input unit configured to receive the preset operation, wherein
the control unit, when the first mode is selected, is configured to
cause the image projector to project the image with the first light intensity while the preset operation is being received by the input unit, and
cause the image projector not to project the image or to project the image with the second, lower light intensity while the preset operation is not being received by the input unit, and
the control unit, when the second mode is selected, is configured to cause the image projector to project the image regardless of whether the preset operation is being received by the input unit or not.

17. The mobile electronic device according to claim 12, further comprising an acceleration sensor configured to detect an acceleration acting on the cabinet, wherein
the control unit, when the acceleration detected by the acceleration sensor exceeds a predetermined value, is configured to select the first mode.

18. The mobile electronic device according to claim 17, wherein
the control unit is configured to further detect a frequency of the acceleration, and
when it is determined that the frequency of acceleration is caused by shakiness of hands, the control unit is configured to select the first mode.

19. The mobile electronic device according to claim 1, wherein the control unit is configured to stop projecting the image when the preset operation is interrupted while being performed.

20. The mobile electronic device according to claim 1, wherein the control unit is configured to dim the projected image when the preset operation is interrupted while being performed.

21. The mobile electronic device according to claim 1, wherein
the first mode is a mobile mode when the mobile electronic device is in motion, and
the second mode is a stationary mode when the mobile electronic device is stationary.

22. A mobile system, comprising:
a mobile electronic device, including
an image projector configured to project an image,
a control unit configured to control a projection operation performed by the image projector,
a power unit configured to supply power to the image projector and the control unit and including a battery configured to be charged by an external power supply,
a cabinet that supports the image projector and the control unit,
a support detector configured to detect whether the cabinet is supported, and
a charging detector configured to detect whether power is supplied externally to the power unit; and
a base for supporting the cabinet of the mobile electronic device, the base including a cooling mechanism for cooling the mobile electronic device, wherein
the control unit is configured to select either one of a first mode and a second mode,
in the first mode, the control unit is configured to
cause the image projector to project the image with a first light intensity while a preset operation is being performed on the mobile electronic device, and
cause the image projector not to project the image, or to project the image with a second, lower light intensity, while the preset operation is not being performed on the mobile electronic device, and
in the second mode, the control unit is configured to cause the image projector to project the image regardless of whether the preset operation being performed on the mobile electronic device or not, and
the second mode is selectable only when it is detected by the support detector that the mobile electronic device is supported by the base and it is detected by the charging detector that the power is supplied externally to the power unit.

23. The mobile system according to claim 22, wherein
the base includes a lens unit in an area where light irradiated from the image projector passes when the mobile electronic device is supported by the base, and
the lens unit is configured to change an angle of view of the light irradiated from the image projector.

24. The mobile system according to claim 22, wherein the base includes a connector by which the battery is connectable to the external power supply through the base.

* * * * *